US012529355B2

(12) United States Patent
Hoffmann

(10) Patent No.: US 12,529,355 B2
(45) Date of Patent: Jan. 20, 2026

(54) DAMPING ASSEMBLY FOR WIND TURBINES

(71) Applicant: WINDSUN PTE LTD, Singapore (SG)

(72) Inventor: Rolf Hoffmann, Singapore (SG)

(73) Assignee: WINDSUN PTE LTD, Singapore (SG)

( * ) Notice: Subject to any disclaimer, the term of this patent is extended or adjusted under 35 U.S.C. 154(b) by 0 days.

(21) Appl. No.: 18/703,550

(22) PCT Filed: Oct. 21, 2022

(86) PCT No.: PCT/AU2022/051265
§ 371 (c)(1),
(2) Date: Apr. 22, 2024

(87) PCT Pub. No.: WO2023/064992
PCT Pub. Date: Apr. 27, 2023

(65) Prior Publication Data
US 2025/0237192 A1 Jul. 24, 2025

(30) Foreign Application Priority Data
Oct. 22, 2021 (AU) ................................ 2021903387

(51) Int. Cl.
*F03D 7/02* (2006.01)
(52) U.S. Cl.
CPC ......... *F03D 7/0276* (2013.01); *F03D 7/0224* (2013.01); *F03D 7/0239* (2023.08); *F05B 2260/71* (2013.01)
(58) Field of Classification Search
CPC .... F03D 7/0224; F03D 7/0239; F03D 7/0276; F05B 2260/71
See application file for complete search history.

(56) References Cited

U.S. PATENT DOCUMENTS

| 2,516,576 A | 7/1950 | Jacobs | |
|---|---|---|---|
| 4,310,284 A * | 1/1982 | Randolph | F03D 7/0224 416/41 |

(Continued)

FOREIGN PATENT DOCUMENTS

| CN | 111173673 A | 5/2020 | |
|---|---|---|---|
| KR | 20120105664 A * | 9/2012 | F03D 1/0675 |

(Continued)

OTHER PUBLICATIONS

Machine translation of CN 11173673 (Year: 2020).*
(Continued)

*Primary Examiner* — Tulsidas C Patel
*Assistant Examiner* — Thomas K Quigley
(74) *Attorney, Agent, or Firm* — Maier & Maier, PLLC

(57) ABSTRACT

A wind turbine hub assembly including: a plurality of radially arranged blade attachment members for attaching blades with a radially outer blade section with a leading edge and trailing edge wherein each blade extends outwardly from and about a central axis of rotation; a central hub assembly configured to rotate about the axis of rotation with the plurality of blade attachment members being radially arranged and hingedly connected relative to the central hub assembly by respective hinge arrangements to allow relative movement of the blade attachment members relative to the central hub assembly; one or more biasing structures operatively coupled with each blade attachment member wherein a first end of said each biasing structure is attached to the central hub assembly and a second end of the biasing structure is attached to a respective blade attachment member for applying a biasing force.

19 Claims, 23 Drawing Sheets

(56) References Cited

U.S. PATENT DOCUMENTS

| | | | |
|---|---|---|---|
| 5,226,805 A * | 7/1993 | Proven | F03D 1/0658 |
| | | | 416/240 |
| 7,066,709 B2 | 6/2006 | Kim et al. | |
| 2005/0196281 A1* | 9/2005 | Kim | F03D 1/0658 |
| | | | 416/132 B |
| 2010/0143131 A1* | 6/2010 | Pitre | F03D 15/00 |
| | | | 416/85 |
| 2011/0211957 A1 | 9/2011 | Folsom et al. | |

FOREIGN PATENT DOCUMENTS

| | | | | |
|---|---|---|---|---|
| KR | 101294010 B1 * | 8/2013 | | F03D 1/0675 |
| WO | WO-2017096645 A1 * | 6/2017 | | F03D 7/0256 |
| WO | WO-2022118327 A1 * | 6/2022 | | F03D 7/0236 |

OTHER PUBLICATIONS

International Search Report issued Dec. 17, 2022, in corresponding International Application No. PCT/AU2022/051265, 5 pages.
Written Opinion of the International Searching Authority issued Dec. 17, 2022, in corresponding International Application No. PCT/AU2022/051265, 7 pages.

* cited by examiner

DAMPING ASSEMBLY FOR WIND TURBINES

TECHNICAL FIELD

The present invention relates to an improved damping assembly for use with wind turbines.

BACKGROUND

Any references to methods, apparatus or documents of the prior art are not to be taken as constituting any evidence or admission that they formed, or form part of the common general knowledge.

Wind turbines operate by using the kinetic energy of the wind, which is then converted to rotational energy by the blades of the turbine which subsequently spins a generator that converts the rotational energy into electrical energy.

There is a need in the field of small wind turbines (5-50 kW), especially in areas with strong winds, to use a passive safety system against overload of the electrical and mechanical components to prevent their destruction. In this patent application a technical solution is described, which works based on a horizontal wind turbine with "down-wind" construction. The wind turbine blades have a flexible suspension at the hub, so that the rotor blades can fold together and unfold again depending on the wind force. A central spring element controls the distribution of forces via a linkage that is directly connected to the blades. The permitted pitch of the blades is determined by two physical variables which are (1) the angle of inclination between the rotor axis and the wing axis and (2) the angle of attack (the so-called pitch). The three blades are controlled synchronously via the linkage and the central spring strut. Due to this synchronicity, a gust of wind cannot cause any damage to the electronics (due to overvoltage) or the mechanics. The aim is to ensure smooth running of the turbine through strong wind phases without having to shut down the turbine.

The flexible diameter of the turbine (1) and the pitch adjustment of the blades (2) are responsible for the power at the main shaft and are controlled solely by the wind pressure on the three blades. The strut provides the counterforce on the wing and keeps the system in balance. U.S. Pat. No. 5,226,805 describes such a mechanism, in which the blades of a wind turbine change their pitch and tilt in response to wind speed and load. The goal is to allow a turbine to run through a high wind phase at full rated power without interruption. Other systems only have protection against short gusts and set up for stop and go operation during high wind phases.

It is therefore necessary to provide an improved damping system (passive control) that allows small wind turbines to operate continuously and generate power even in sustained strong winds above rated power or in stronger gusts without damaging the rotor, generator, or other parts of the wind turbine.

SUMMARY

In one aspect, the invention provides a wind turbine hub assembly comprising:

a plurality of radially arranged blade attachment members for attaching blades with a radially outer blade section with a leading edge and trailing edge wherein each blade extends outwardly from and about a central axis of rotation;

a central hub assembly configured to rotate about the axis of rotation with the plurality of blade attachment members being radially arranged and hingedly connected relative to the central hub assembly by respective hinge arrangements to allow movement of the blade attachment members relative to the central hub assembly;

one or more biasing structures operatively coupled with each blade attachment member wherein a first end of each said one or more biasing structures is attached to the central hub assembly and a second end of the one or more biasing structures is attached to a respective blade attachment member for applying a biasing force, during use, to extend the blade attachment member and an outer section of each blade attached to said blade attachment members to a neutral pitched position and whereby the biasing force applied by the biasing structure resists the movement of the blade attachment member and an outer section of each blade to a coned position during use.

In an embodiment, the central hub assembly comprises a central plate with the plurality of the blade attachment members being radially arranged and hingedly connected to the central plate at a connecting location by the respective hinge arrangements to allow movement of the blade attachment members relative to the central plate.

In an embodiment, the central hub assembly further comprises a shaft receiving member that is spaced away from the central plate along a direction of the axis of rotation, the first part of each biasing structure being attached to said shaft receiving member.

In an embodiment, the biasing structure is movable between:

an extended configuration to apply the biasing force to maintain the blades and the blade attachment members in the neutral pitched position; and a retracted configuration when the biasing force applied by the biasing structure is overcome by forces applied on the blades and blade attachment members by wind.

In an embodiment, in the extended position, the central plate substantially lies in the same plane as the plane of the blade attachment members.

In an embodiment, the first end of said one or more biasing structures is attached to the central hub assembly by a first swivel joint mechanism.

In an embodiment, the first end of said one or more biasing structures is attached to a portion of the shaft receiving member by the first swivel joint mechanism.

In an embodiment, the second end of the one or more biasing structures is attached to a radially inner end portion of a respective blade attachment member by a second swivel joint mechanism.

In an embodiment, the second end of the one or more biasing structures is attached to an attachment arm extending in a radially inner direction from the inner end portion of the respective blade attachment member.

In an embodiment, each blade attachment member is hingedly connected to the central plate by one or more spaced apart hinge members with the attachment arm extending transversely relative to a hinge axis defined by the spaced apart hinge members.

In an embodiment, in the neutral position, the second end of the one or more biasing structures for each blade attachment member is offset from the hinge axis by being attached to the attachment member.

In an embodiment, the hinge axis for each of the blade attachment members extends transversely relative across the plane of the blade attached to the blade attachment member and wherein respective hinge axes for each blade attachment members are non-parallel to each other.

In an embodiment, the second one or more biasing structures moves away from the central plate as the blade attachment member attached to said second end undergoes movement towards the coned position thereby increasing an angle of inclination of the biasing structure relative to the central plate of the central hub assembly.

In an embodiment, each biasing structure comprises a damping assembly comprising a sealed and fluid filled cylinder to apply the biasing force on a piston rod and extend the piston rod in the neutral position.

In an embodiment, the first end of the biasing structure is located at or adjacent an end portion of the cylinder and wherein the second end is located at or adjacent an end portion of the piston rod.

In an aspect, the invention provides a wind turbine assembly comprising:
- a plurality of blade assemblies, each blade assembly comprising a blade having a radially outer blade section with a leading edge and trailing edge wherein each blade extends outwardly from and about an axis of rotation.
- a central hub being connected to a radially inner connecting portion of each blade assembly wherein the central hub is configured to rotate about the axis of rotation; wherein the radially connecting portion of the blade assembly is hingedly connected to a radially outer blade section by a hinge arrangement to allow relative movement of the radially outer section about a hinge axis; and
- a biasing structure operatively coupled with each blade wherein a first part of the biasing structure is attached to the central hub and a second part of the biasing structure is attached to the outer section of each blade for applying a biasing force to extend the outer section of each blade to a neutral pitched position and whereby the biasing force applied by the biasing structure resists movement of the outer section of each blade to a coned position during use.

In an embodiment, the biasing structure is configured to apply the biasing force such that in the neutral pitched position an angle between a plane of rotation of the hub and the leading edge of each blade is less than ten degrees and more preferably less than five degrees.

In an embodiment, the biasing structure is configured to allow movement of the outer section of each blade, during use, when forces applied by wind overcome the resistive force applied by the biasing structure to the coned position such that an angle between the plane of rotation of the hub and the leading edge of each blade in the coned position is greater than thirty degrees and more preferably greater than fifty degrees.

In one embodiment, the biasing device is configured to allow the pitch of the blade to change during use as the forces applied by the wind overcome the drag force introduced by the biasing structure.

In an embodiment, the biasing structure is movable between:
- an extended configuration to apply the biasing force to maintain the blades in the neutral pitched position; and
- a retracted configuration when the biasing force applied by the biasing structure is overcome by forces applied on the blades by wind.

In an embodiment, in the retracted configuration, the angle between the plane of rotation of the hub and the leading edge of each blade in the coned position is greater than thirty degrees and more preferably greater than fifty degrees and still more preferably less than ninety degrees.

In an embodiment, in the retracted configuration, the leading edge of each blade in the coned position is substantially parallel with the wind.

In an embodiment, in the retracted configuration, the leading edge of each blade in the coned position is substantially orthogonal to the plane of rotation of the hub.

In an embodiment, the first end of the biasing structure is attached to the central hub by a first movable ball joint or swivel joint mechanism.

In an embodiment, the second end of the biasing structure is attached to the respective outer section of the blade by a second ball joint or swivel joint mechanism.

In an embodiment, the biasing structure comprises a plurality of biasing sub-structures such that each biasing sub-structure is operatively coupled with each blade and the hub such that a first end of each biasing sub-structure is attached to the central hub and a second end of each biasing sub-structure is attached to the outer section of a respective blade for applying the biasing force to extend the outer section of each blade to a neutral pitched position and whereby the biasing force applied by the biasing structure resists movement of the outer section of each blade to a coned position during use.

Preferably, each biasing sub-structure comprises a damping assembly comprising a sealed and fluid filled cylinder to apply the biasing force on a piston rod and extend the piston rod in the neutral position.

In an embodiment, the first end is located at or adjacent an end portion of the cylinder and wherein the second end is located at or adjacent an end portion of the piston rod.

In an embodiment, the biasing structure comprises a central damping structure mounted on the central hub, the central damping structure comprising a fixed member mounted on the central hub and a resiliently biased movable member disposed relative to the fixed member and wherein the second part of the biasing structure comprises a plurality of connecting arms, wherein a first end of each connecting arm is attached to the outer section of each blade and a second end of each connecting arm is attached to the resiliently biased movable member.

In one aspect, the fixed member comprises a pressurized fluid filled cylinder and wherein the movable member comprises a piston rod that is movably disposed within the fluid filled cylinder such that during use biasing force applied by the pressurized fluid in the cylinder on the piston rod resists or damps the resists movement of the outer section of each blade to the coned position during use and whereby movement of the outer section of each blade to the coned position effects retraction of the piston rod into the cylinder.

In an alternative aspect, the fixed member comprises a pressurized fluid filled cylinder and wherein the movable member comprises a piston rod that is movably disposed within the fluid filled cylinder to apply a resilient bias to resist extension of the piston rod such that during use biasing force acting on the piston rod resists or damps the movement of the outer section of each blade to the coned position during use and whereby movement of the outer section of each blade to the coned position effects extension of the piston rod relative to the cylinder.

In an embodiment, the fixed member comprises a single pressurized fluid filled cylinder and wherein the movable member comprises a plurality of piston rods that are movably disposed within the fluid filled cylinder.

In an embodiment, the connecting arm is attached to movable member and/or the outer section of each blade by a corresponding movable joint or swivel joint mechanism.

In an embodiment, the fixed mounted member comprises an elongate configuration whereby the elongate fixed mounted member is substantially aligned with the axis of rotation of the central hub.

In an embodiment, the radially inner connecting portion of each blade assembly comprises a hinge body with a first hinge body portion being substantially non-movably fastened to the central hub and a second hinge body portion being movably fastened to the outer blade section by the hinge arrangement to allow relative movement of the radially outer blade section about the hinge axis.

In an embodiment, the hinge body lies in a plane that is substantially orthogonal relative to the axis of rotation of the central hub. Preferably, the hinge axis for each of the blade assemblies extends transversely relative across the plane of the outer blade section and wherein respective hinge axes for each blade assembly are non-parallel to each other.

In an embodiment, the pressurised fluid is preferably a compressible fluid.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF EMBODIMENTS

Figure 9:
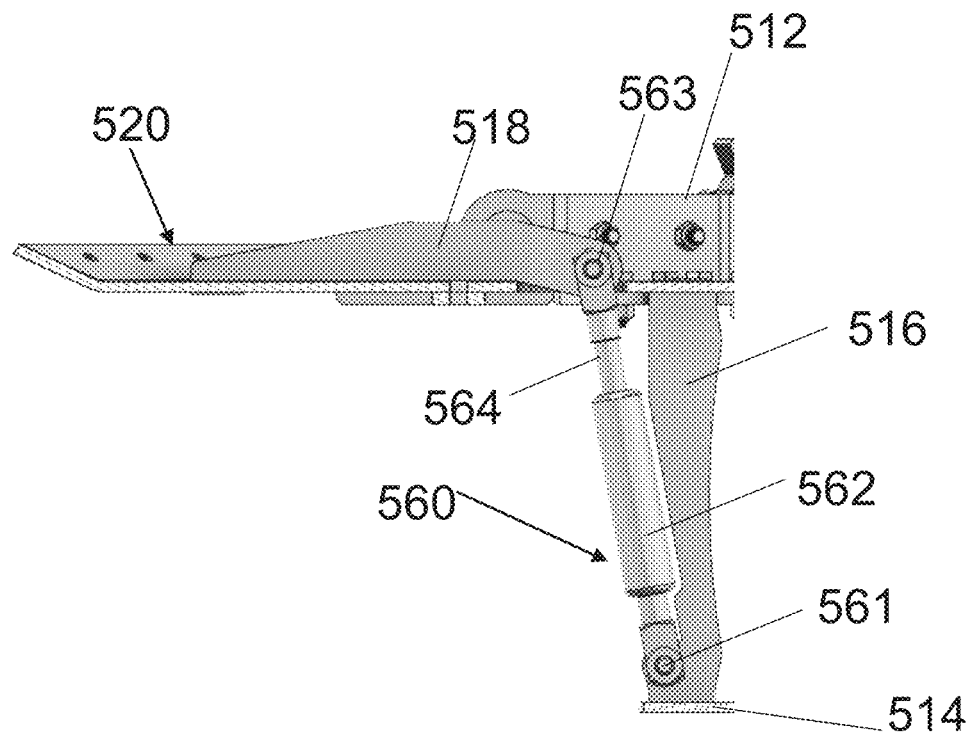
FIG. 9 shows an enlarged side view of the wind turbine assembly 500 in which the damping structure 560 is shown in a fully extended and neutral configuration.
Figure 10:
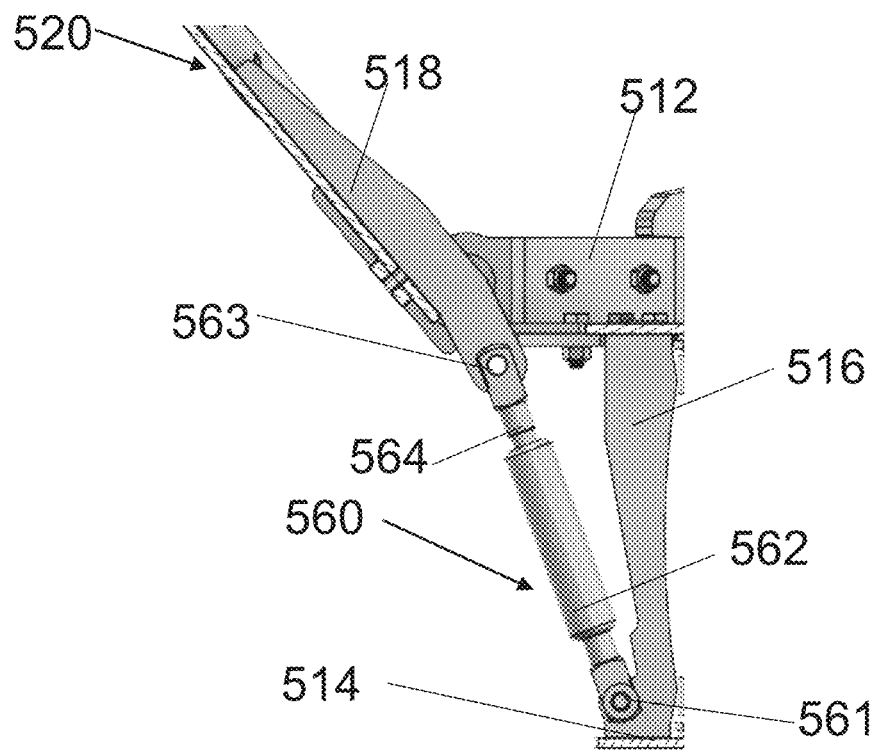
FIG. 10 shows an enlarged side view of the wind turbine assembly 500 in which the damping structure 560 is shown in a compressed configuration whereby the blade attachment members 520 are in a coned configuration.
Figures 11, 12:
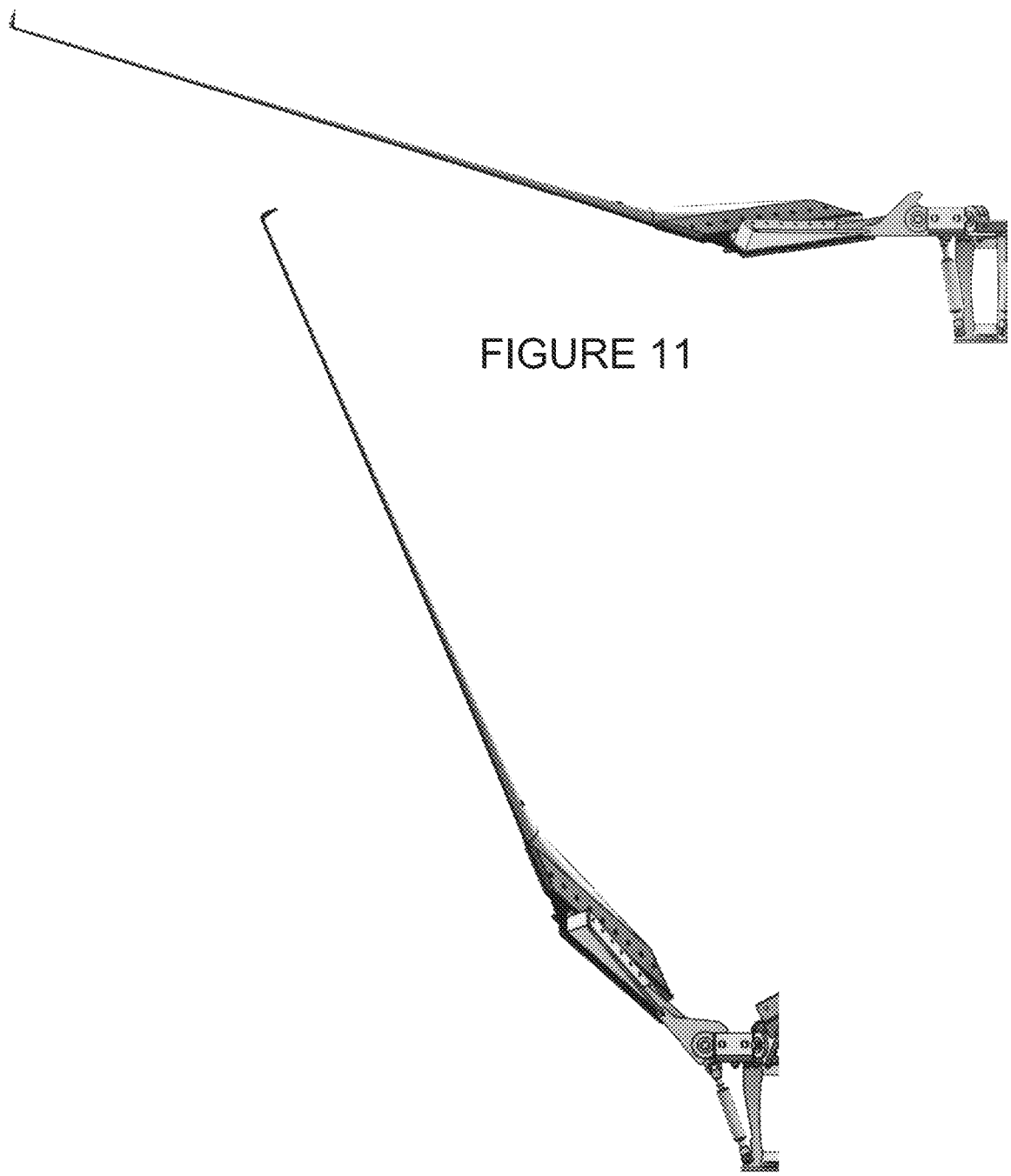
FIGS. 11 and 12 show blade members being attached to the wind turbine assembly 500 in a neutral and coned configuration respectively.

FIGS. 1 to 12 illustrate a first preferred embodiment of a wind turbine hub assembly 500 in accordance with a preferred embodiment. The wind turbine hub assembly 500 comprises a central hub assembly 510 with a plurality of radially arranged blade attachment members 520. Each of the plurality of blade attachment members 510 are provided to allow attachment of wind turbine blades (as shown in FIGS. 11 and 12). Each blade comprises an outer blade section with a leading edge and a trailing edge and the blade attachment members 520 allow the blades to be mounted thereon so that each blade extends outwardly from and about a central axis of rotation. A radially inner portion of each blade is attached to a radially outer edge 522 of each blade attachment member 520.

The central hub assembly 510 comprises a central plate member 512 that has a polygonal shape with the three blade attachment members 510 being hingedly connected to a first plurality of alternating sides of the polygon shaped central plate member 512 by hinge plates 540 that are arranged on a second plurality of alternating sides of the polygonal central plate member 512. The central plate member 512 in this embodiment is hexagonal with three alternating sides being used for fastening the blade attachment members 520 and the other three alternating sides being used for mounting the hinge plates 540. Each hinge plate 540 is positioned between two adjacent plate attachment members 520. The role of the hinge plates 540 will be discussed extensively in the foregoing sections.

The central hub assembly 510 is configured to rotate about the axis of rotation with the plurality of the blade attachment members 520 being radially arranged around the central hub assembly 510, specifically the central plate 512 as previously described. The central hub assembly 510 also includes a shaft receiving member 514 that is spaced away from the polygonal central plate member 512 along the axis of rotation of the central hub assembly 510. In the preferred embodiment, the central portions of the central plate member 512 and the shaft receiving member 514 have co-axial openings 511 and 513 to receive a shaft of a wind turbine (not shown).

The wind turbine hub assembly 500 also comprises three biasing structures 560 that are operatively coupled with each of the blade attachment members 520 respectively and the central hub assembly 510. The first end of each biasing structure 560 is attached to the shaft receiving member 514 by a swivel joint 561 and a second end of the biasing structure 560 is attached to a respective blade attachment member 520 by a second swivel joint mechanism 563. The respective first ends of the three biasing structures 560 are circumferentially arranged and attached on the shaft receiving member 514 through the three corresponding swivel joint mechanisms 561 of the first type. The second end of each biasing structure 560 terminates in the swivel joint mechanism 563 of the second type that is attached to an attachment arm 518 (See FIG. 6) that extends in a radially inner direction from the blade attachment member 510. Each of the biasing structures 560 is provided for applying a biasing force to extend the blade attachment member 520, it is attached to, into a neutral and pitched configuration so that the blade members attached to the respective blade attachment members 510 remain in a pitched position. The biasing force applied by each of the biasing structures 560 resists movement of the respective blade attachment members 520 they are attached to a coned position during use.

Figure 1:
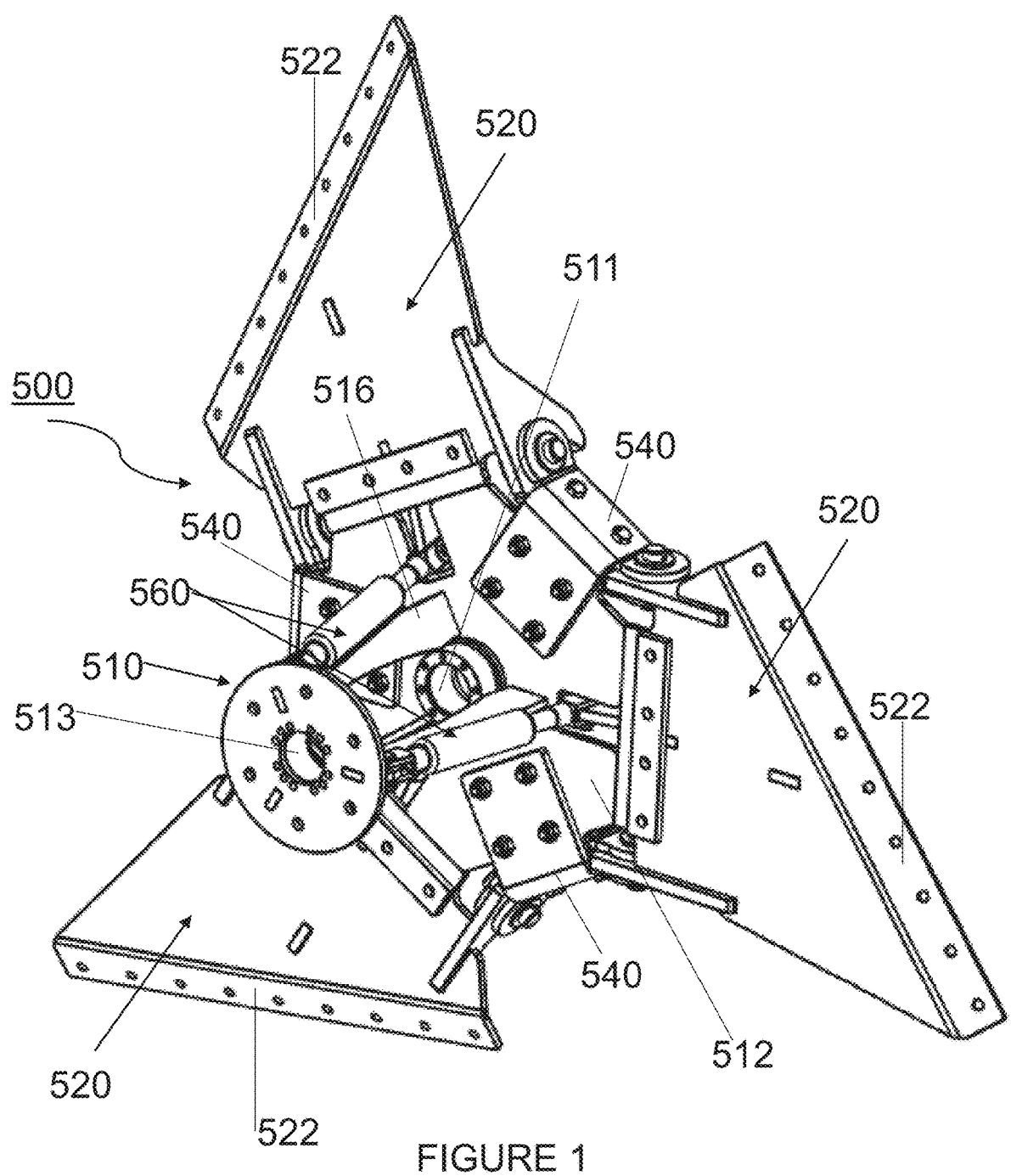
FIG. 1 is a rear perspective view of the wind turbine hub assembly 500 in accordance with a first preferred embodiment.
Figure 2:
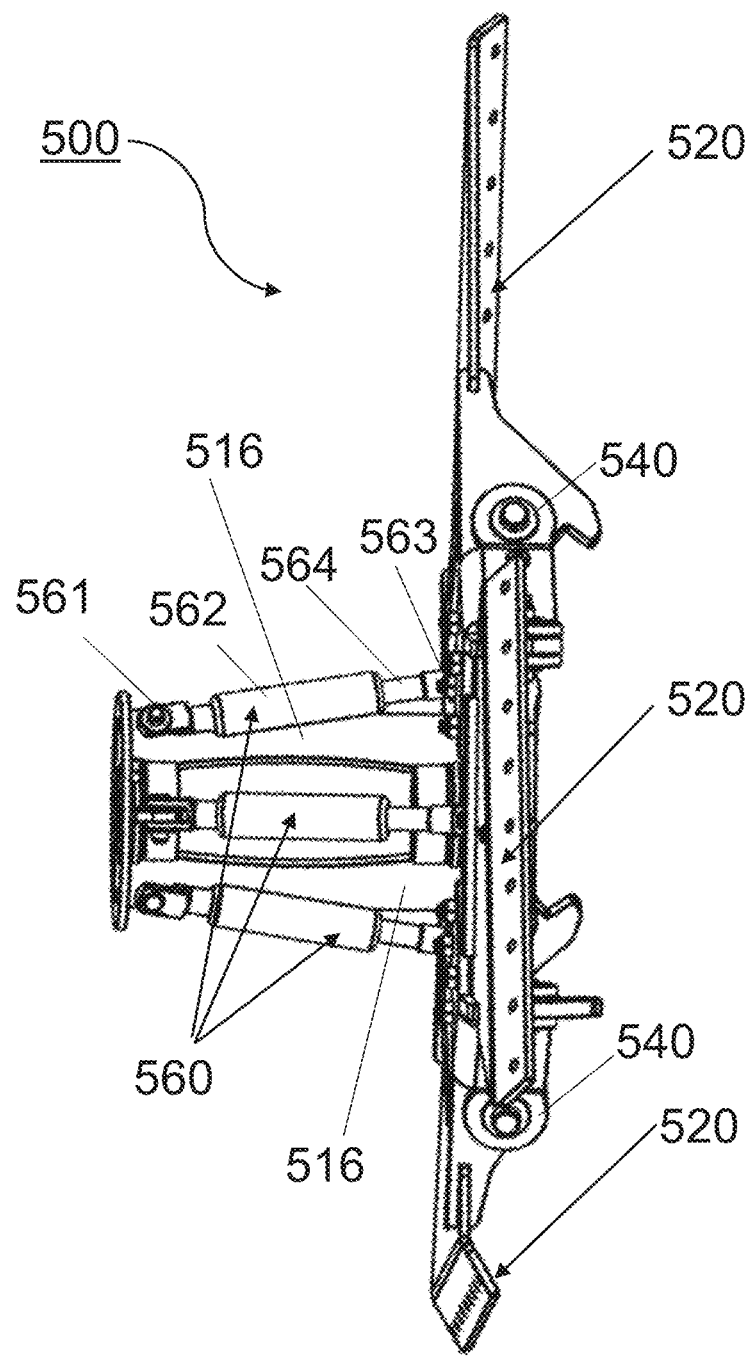
FIG. 2 is a side view of the wind turbine hub assembly 500.
Figure 3:
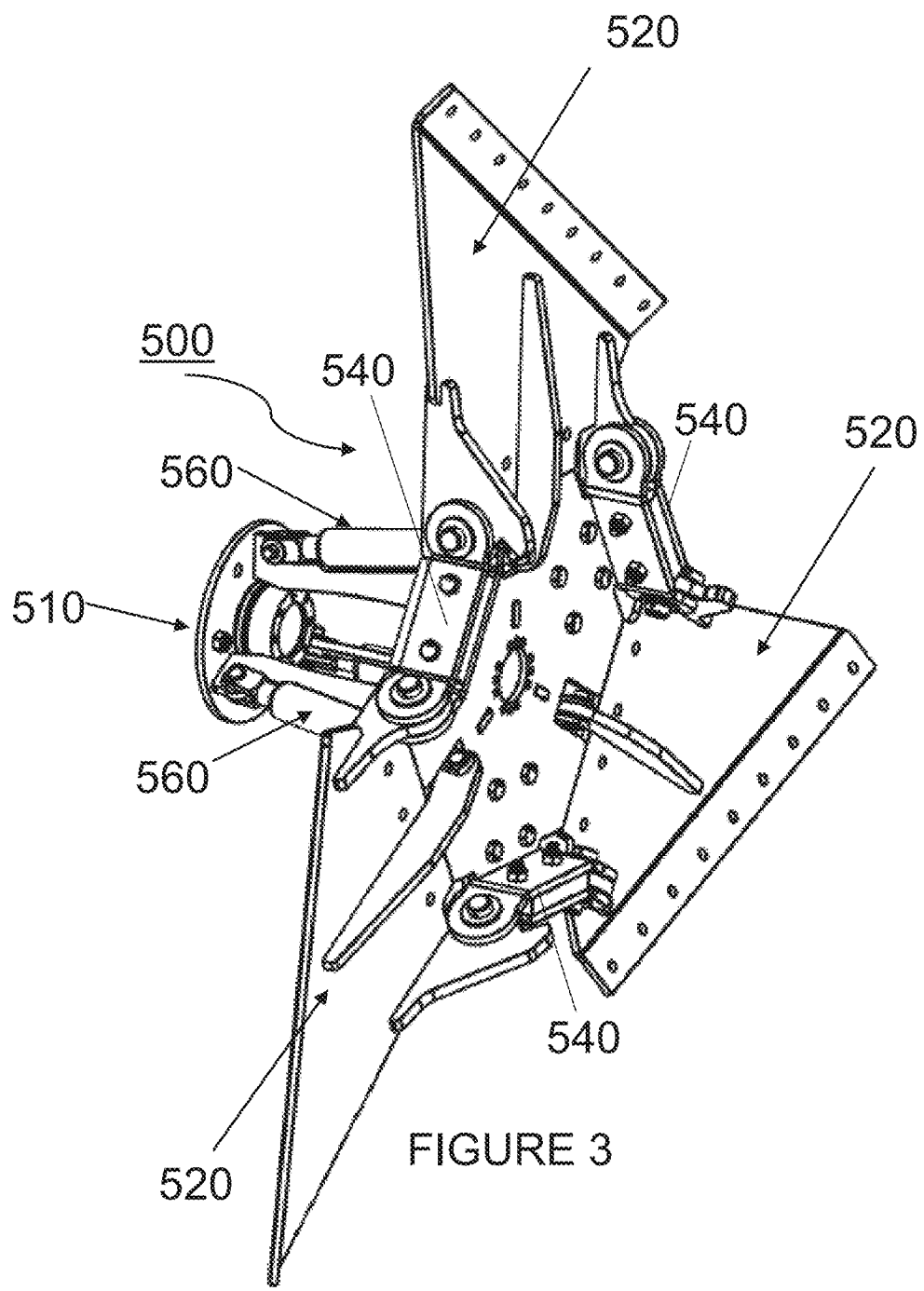
FIG. 3 is a top frontal perspective view of the wind turbine hub assembly 500.
Figure 7:
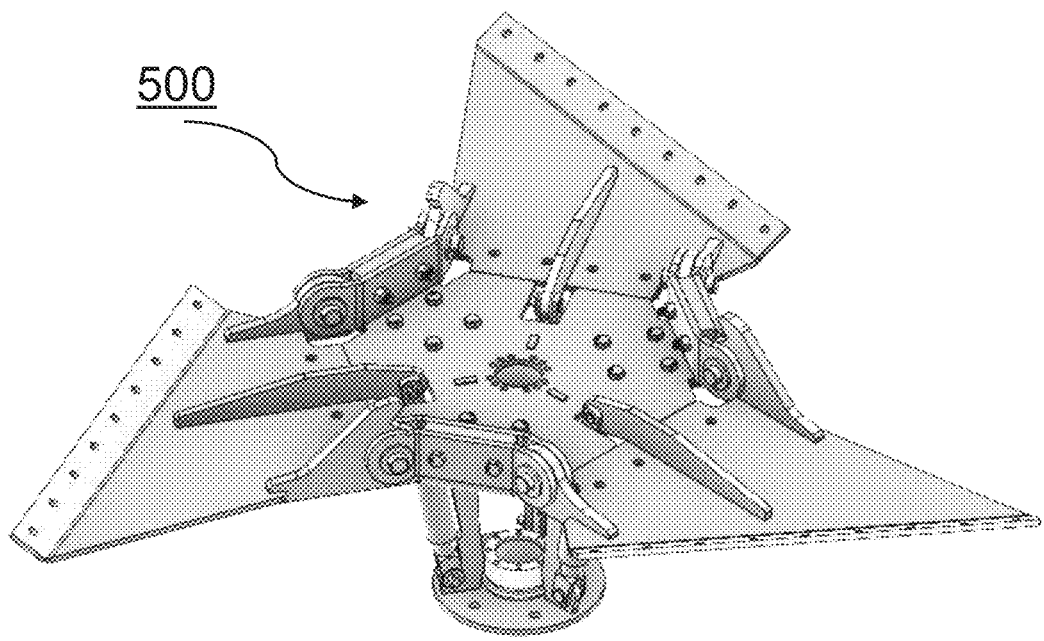
FIGS. 7 and 8 show a frontal perspective view of the wind turbine hub assembly 500 in a partially and fully coned configuration respectively.
Figure 8:
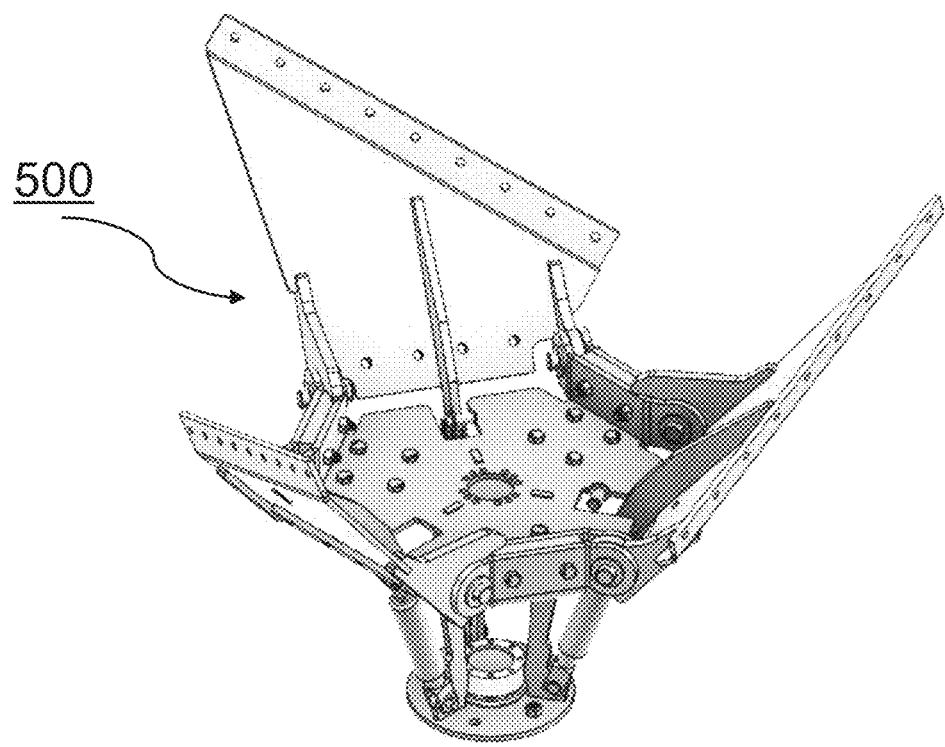

In this preferred embodiment, the biasing structure 560 (See FIG. 2 in particular) takes the form of a compressible gas spring with a first part of the biasing structure 560 being a cylinder 562 (filled with pressurised fluid) attached to the shaft receiving member 514 as previously discussed. A second part of the biasing structure 560 is in the form of a piston 564 (that is movably disposed within the fluid filled cylinder 562) is attached to the blade attachment member 520 for applying a biasing force to extend the outer blade section of each blade attached to the blade attachment member 520 to a neutral pitched position. During use, the biasing force applied by the biasing structure 560 resists movement of the outer section of each outer blade section of the blade attached to the respective blade attachment member 520 to a coned position during use. When a force (such as strong wind forces) act on the piston rod 564, the piston rod 564 is pushed/compressed inwards by that force and the compressed fluid within the cylinder 562 that extends the piston rod 564 outwards resists the compression of the piston rod 564. The gas compression spring provided by the biasing structure 560 allows a smooth transition in damping and the piston 564 returns to its initial position in the absence of the additional forces applied by the wind gusts. In the neutral position, when the piston rod 564 is in the fully extended position, the polygonal central plate 510 substantially lies in the same plane as the blade attachment members 520 (as seen in FIG. 2). FIGS. 7 and 8 show the blade attachment members 520 in coned positions. FIGS. 10 and 12 show detailed views of the biasing structure 560 in a compressed configuration when the blade attachment members 520 are forced into a coned position due to thrust forces applied by wind. FIGS. 9 and 11 illustrate the neutral position in which the biasing structure 560, particularly the piston rod 564 in the biasing structure 560 is in the fully extended position.

Figure 6:
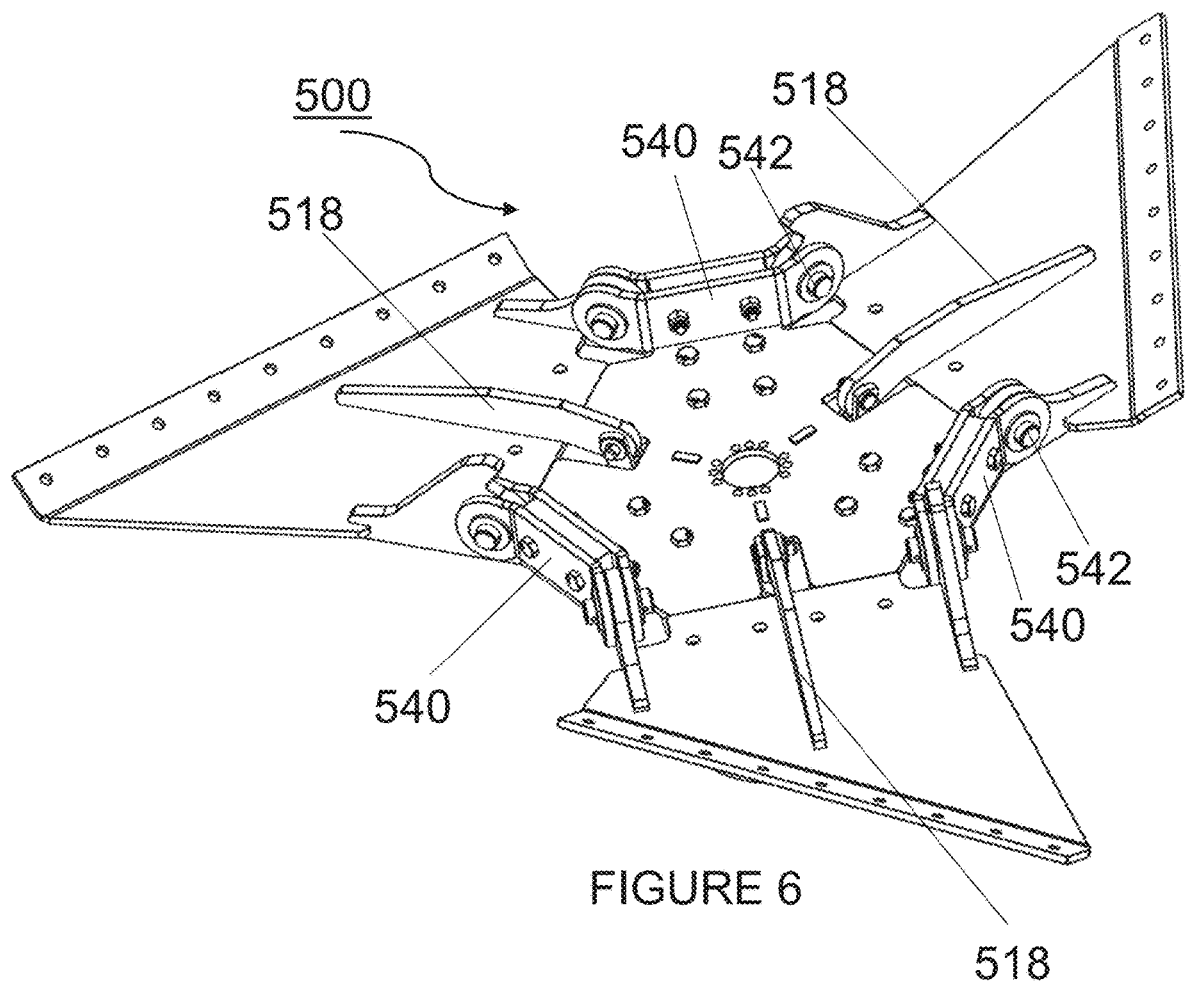
FIG. 6 is another frontal perspective view of the wind turbine hub assembly 500.

We now refer to FIG. 6 in particular where it is clearly shown that each blade attachment member 520 is hingedly connected to the polygonal central plate 512 by the hinge plates 540. The blade attachment members 520 are hingedly connected by way of utilizing the hinge members 542 provided on each hinge plate 540. The radially inner portion of each blade attachment member 520 is flanked by two hinge plates 540 that are located at either end of the inner portion of the blade attachment member 520. Each hinge plate 540 comprises hinge members 542 which enable the blade attachment members 520 to be hingedly connected to central hub plate 512. The proximally located hinge members 542 for each of the two hinge plates 540 are spaced apart by the length of the radially located inner edge of the blade attachment member 520 and flank the inner edge of the blade attachment member 520 to define a hinge axis about which the blade attachment member 520 can hingedly move relative to the central hub assembly 510, specifically the central plate 512 of the central hub assembly 510. For every blade attachment member 520, the attachment arm 518 for attachment of the blade attachment member 520 to the second end or the piston rod 564 of the biasing structure 560 through the second swivel joint mechanism 563. The attachment arm 518 extends transversely relative to the hinge axis of the hinge members 542 that hingedly connect each blade attachment member 520 to the central plate 512. The attachment arm 518 for each blade attachment member 520 extends in between the two hinge members 542 that provide for the hinged movement of said each blade attachment member 520. As shown best in FIG. 6, the attachment arm 518 extends slightly beyond the radial inner edge of the blade attachment member to receive the second swivel joint mechanism 563 that connects the piston end 564 for the respective biasing structure 560 biasing the movement of the blade attachment member 520. As a result, in the neutral position (again shown in FIGS. 6, 8 and 10), the second end, particularly the second swivel joint mechanism 563 of the biasing structure 560 is offset from the hinge axis of the blade attachment member 520 due to the provision of the attachment arm 518 with an extended configuration. As shown in FIGS. 10 and 12, as thrust applied by wind pushes the blades and the blade attachment members 520, the blade attachment members 520 undergo hinged movement relative to the central plate 512 of central hub assembly 510 which results in the compression of the piston rod 564 into the fluid filled cylinder 562 of the biasing structure 560. The second swivel joint mechanism 563 moves from the initially offset position to increase the spacing between the central plate 512 and the second end, specifically the second swivel joint mechanism 563 of the biasing structure 560.

The central plate 512 and the spaced apart shaft receiving member 514 are connected by a number of connecting and reinforcing members 516 that form part of the central hub assembly 510. Compression of the piston rod 564 in each biasing structure 560 results in the second end of the biasing structure moving away from the reinforcing members 516 which results in the increase in the angle of inclination of the biasing structure 560 relative to the reinforcing members 516 as shown in FIGS. 9 and 10. Similarly, the movement of the second end of the biasing structure 560 results in a decrease in the angle of inclination of the biasing structure relative to the central plate 512 (also shown in FIGS. 9 and 10).

Figure 4:
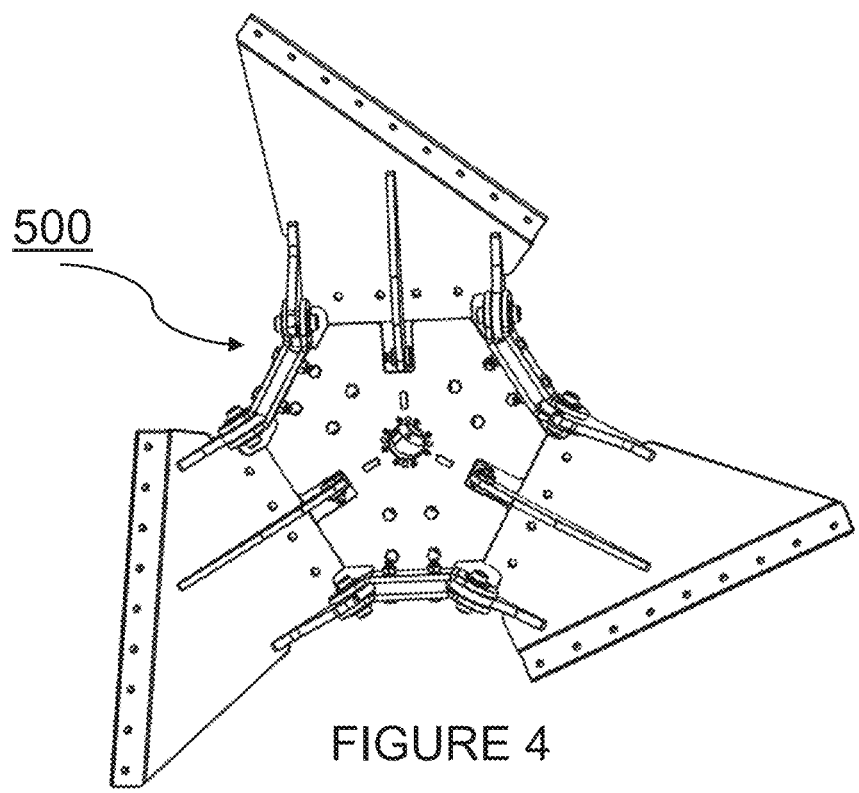
FIG. 4 is a frontal view of the wind turbine hub assembly 500.
Figure 5:
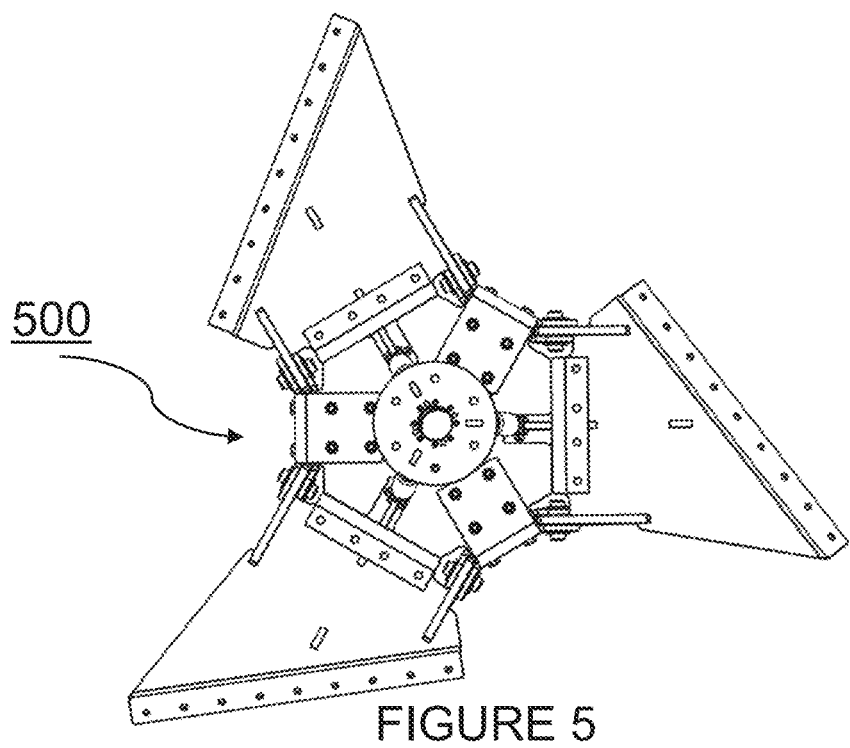
FIG. 5 is a rear view of the wind turbine hub assembly 500.
Figure 13:
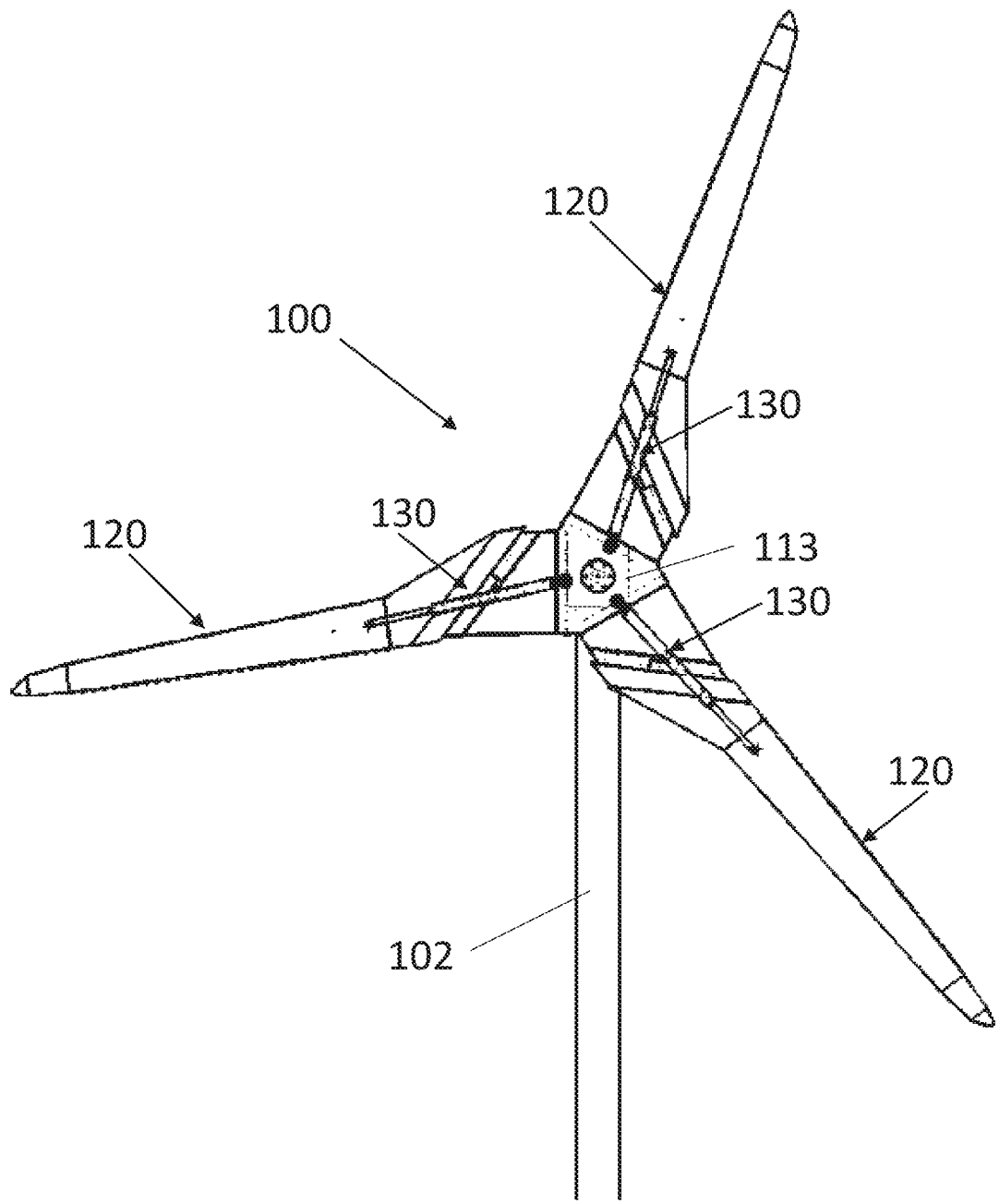
FIG. 13 is a frontal view of a wind turbine assembly 100 in accordance with a first embodiment.

FIGS. 13 to 4 illustrate a first embodiment of a wind turbine assembly 100 in accordance with the invention. FIG. 13 illustrates a wind turbine assembly 100 for generating electricity. The wind turbine assembly 100 includes a support post 102 that can be secured to the ground or any other building structure through an appropriate securement means. The post 102 comprises a rotatable director with an outer housing. An electrical generator is mounted within the housing and connected to wiring which runs through the director and the post 102. The rotor of the generator is driven by a rotatable shaft which typically carries at its end a rotatable hub portion 113 (which can rotate about a rotation axis) from which three equiangularly spaced blade assemblies 120 extend radially. It important to note that the number of blade assemblies attached to the central hub portion 113 is not limited in any way.

Figure 14:
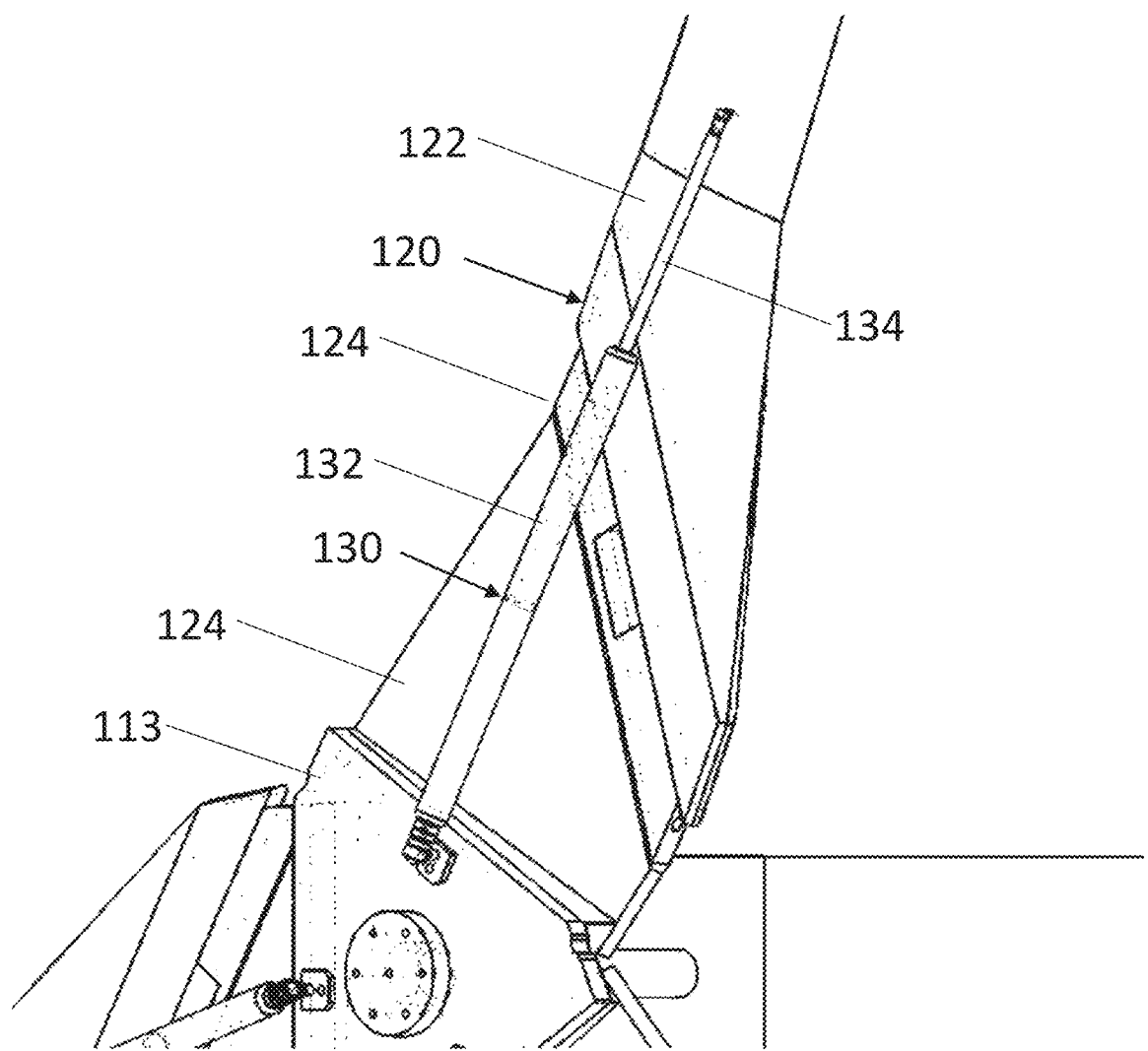
FIG. 14 is an enlarged view of each hinged blade assembly 120 incorporating a biasing structure 130.

Turning to FIG. 14, each blade assembly 120 comprises a radially outer blade section 122 (with a leading edge and trailing edge) and a radially inner blade section 124 which is connected to the central hub 113. Importantly, the radially inner blade section 124 (which functions as a hinge) is hingedly connected to the outer blade section 122 by a hinged connection 123. For each blade assembly 120, a corresponding biasing structure 130 is provided. In this preferred embodiment, the biasing structure 130 takes the form of a compressible gas spring with a first part of the biasing structure 130 being a cylinder 132 (filled with pressurised fluid) attached to the central hub 113. A second part of the biasing structure 130 is in the form of a piston 134 (that is movably disposed within the fluid filled cylinder 132) is attached to the outer blade section 122 for applying a biasing force to extend the outer blade section 122 of each blade assembly to a neutral pitched position. During use, the biasing force applied by the biasing structure 130 resists movement of the outer section of each outer blade section 122 to a coned position during use. When a force is acting on the piston rod 134, the piston 134 compresses the fluid within the cylinder 132. The gas compression spring provided by the biasing structure 130 allows a smooth transition in damping and the piston 134 returns to its initial position in the absence of the additional forces applied by the wind gusts. As shown most clearly in FIG. 14, an end portion of the cylinder 132 is fastened to the hub 113 by a swivel joint mechanism. Similarly, an end portion of the piston rod 134 is attached to the outer blade section 122 by a ball joint mechanism. The joint mechanisms will be discussed in further in some of the other foregoing embodiments.

The biasing structure 130 provides a damping mechanism for the wind turbine assembly 100 with the provided blade assembly 130 having a hinged structure which allows the blades to alter their pitch angles and tilt angels automatically in response to change in both wind speed and load. During periods of high wind speeds (or gusts), the biasing force on each piston 134 is overcome which allows the tilt angle for each blade assembly 130 to be changed resulting in coning of the blade assemblies 130. With the change of the tilt angle the pitch angle also changes. In a particular working configuration, the more the blade pulls on its hinge (due to high wind speeds), the further it pitches towards the stall. When the turbine reaches steadiness at a particular point, each blade assembly 130 rotates fast enough to keep the hinge pulled into the stall position and prevent any further increase in rotational speed of the central hub 113. The blade coning reduces stress on the rotor and smoothens the turbine's response to gusty conditions. The coning of the blade assemblies 130 decreases the rotor disc size at very high wind speeds and the change of the pitch angle negatively influences the flow characteristics of the rotor blades and thereby both changes also reduce the turbine's load. This is the peak regulation. When the turbine is attached to the grid, the RPM is also regulated by the 18 mount of load applied by a generator. This configuration allows the continued generation of power in all wind speeds, unlike alternative wind turbines which are required to brake in high wind conditions or to turn out of the wind. So, the installation of the biasing arrangement 130 provides a damping effect and allows the wind turbine 100 to work even during higher gusts.

Figure 15:
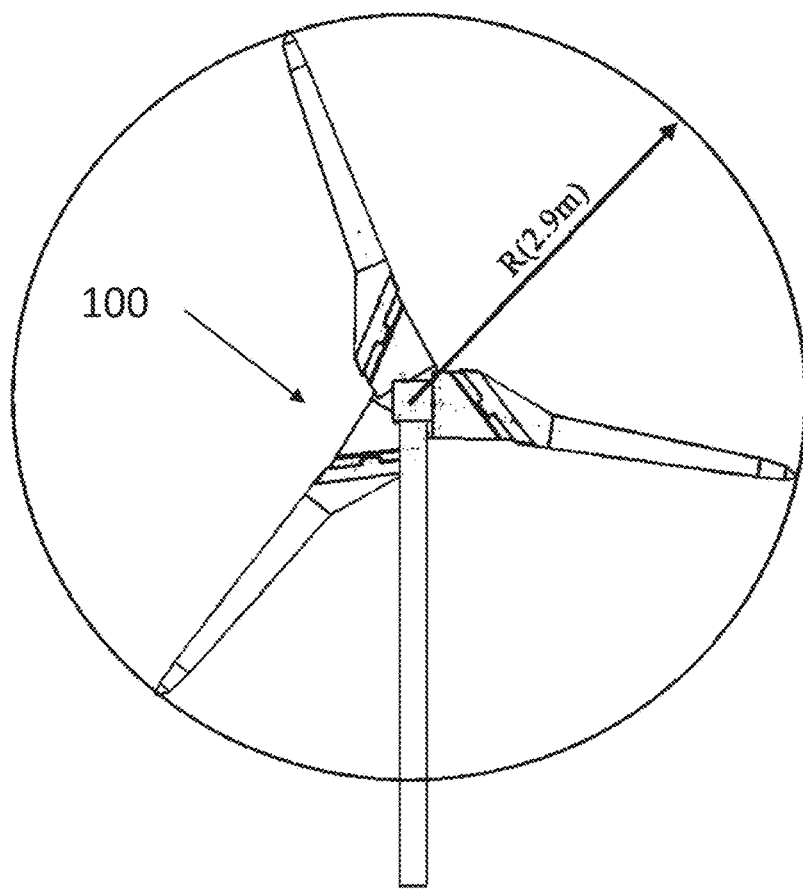
FIG. 15 is a view of the wind turbine assembly 100 in an initial position.
Figure 16:
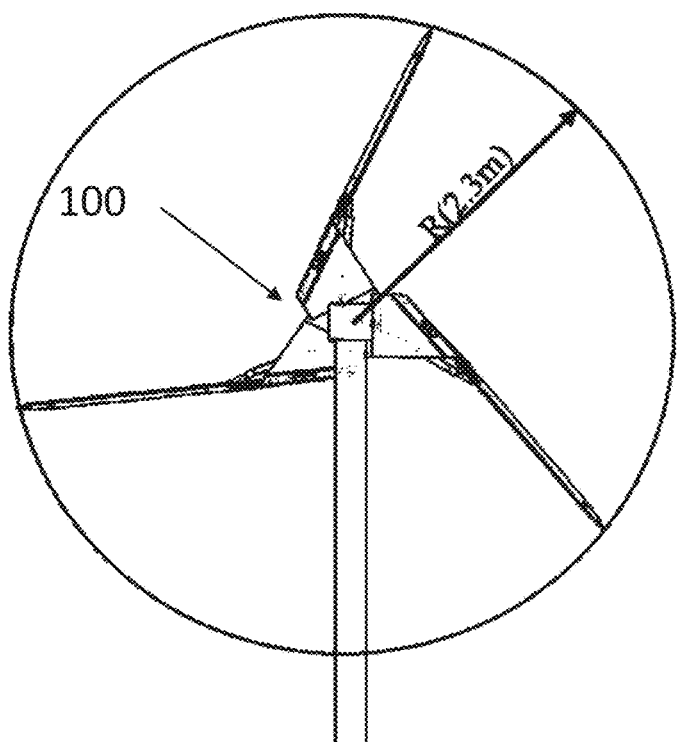
FIG. 16 is a view of the wind turbine assembly 100 shown in a pitched or coned configuration.

Turning to FIGS. 14 and 15, FIG. 15 shows the initial position of the turbine and has the rotor radius of 2.9 m. The measured angle between the rotor plane and the leading edge of the blade section is −1.74°. The following figure (FIG. 16) shows that the pitched and coned blade sections 122 of the turbine assembly 100 has a rotor radius of 2.3 m. The measured angle between the rotor plane and the leading is 55°.

Figure 17:
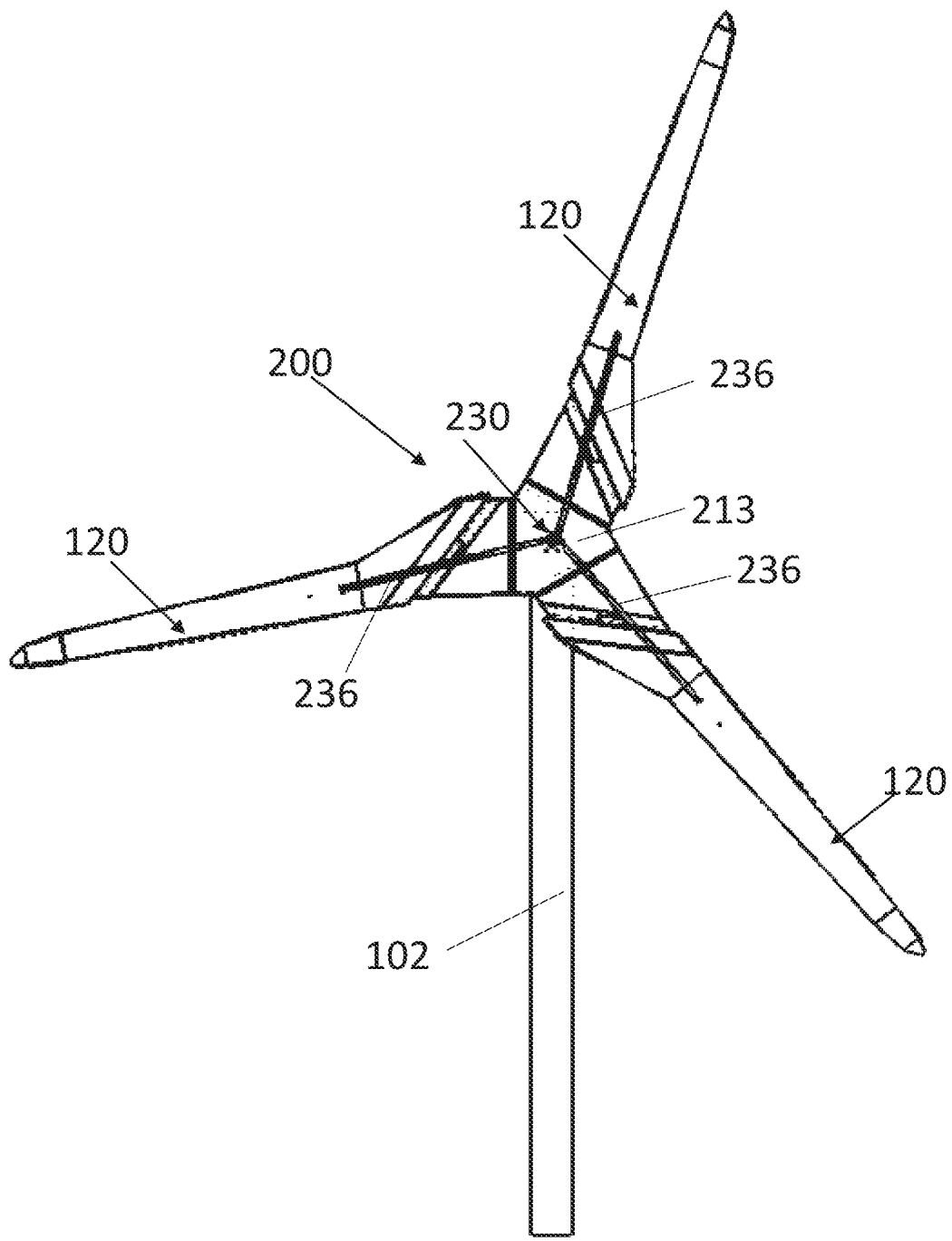
FIG. 17 is a frontal view of a wind turbine assembly 200 in accordance with a second embodiment.
Figure 18:
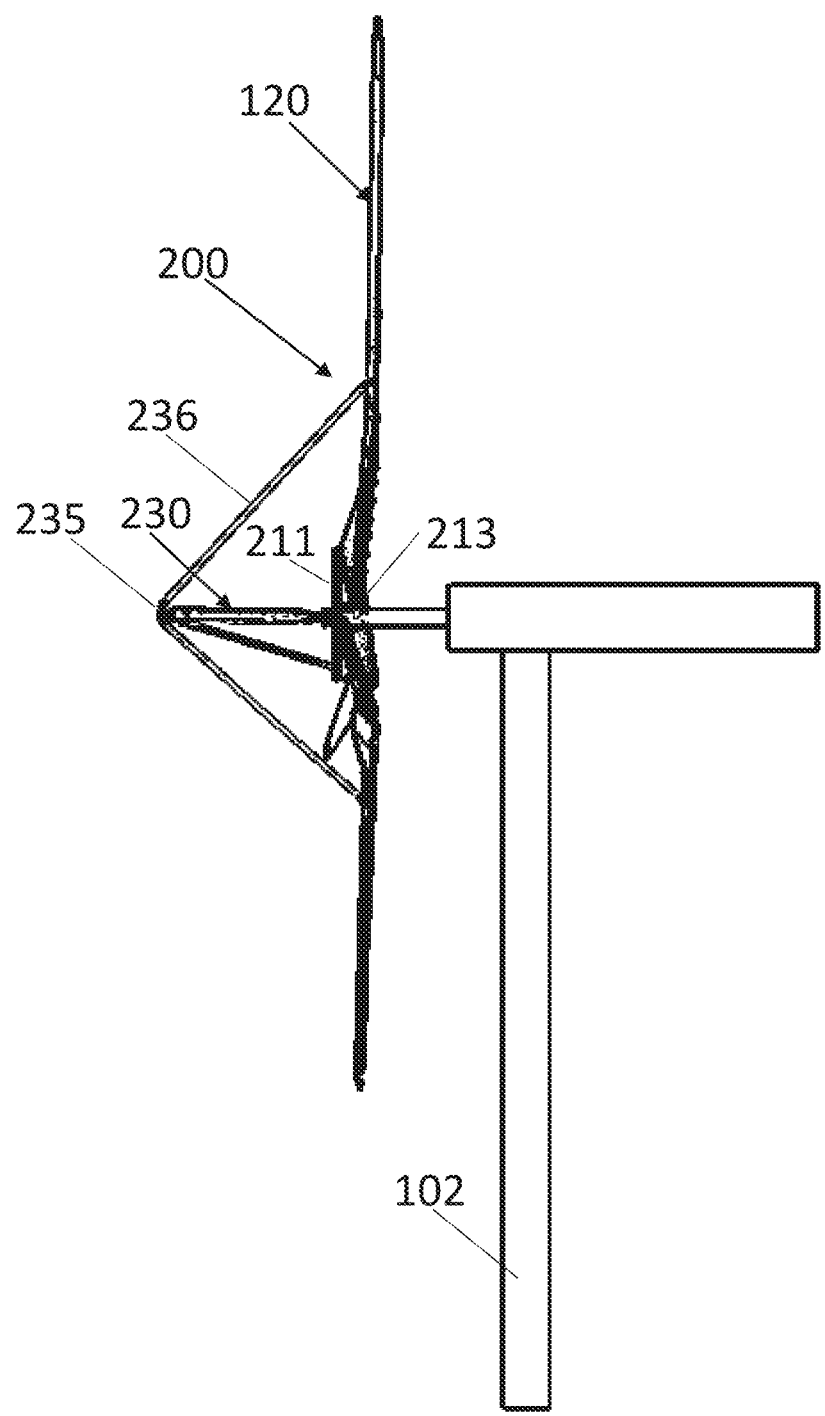
FIG. 18 is a side view of the wind turbine assembly 200.
Figure 19:
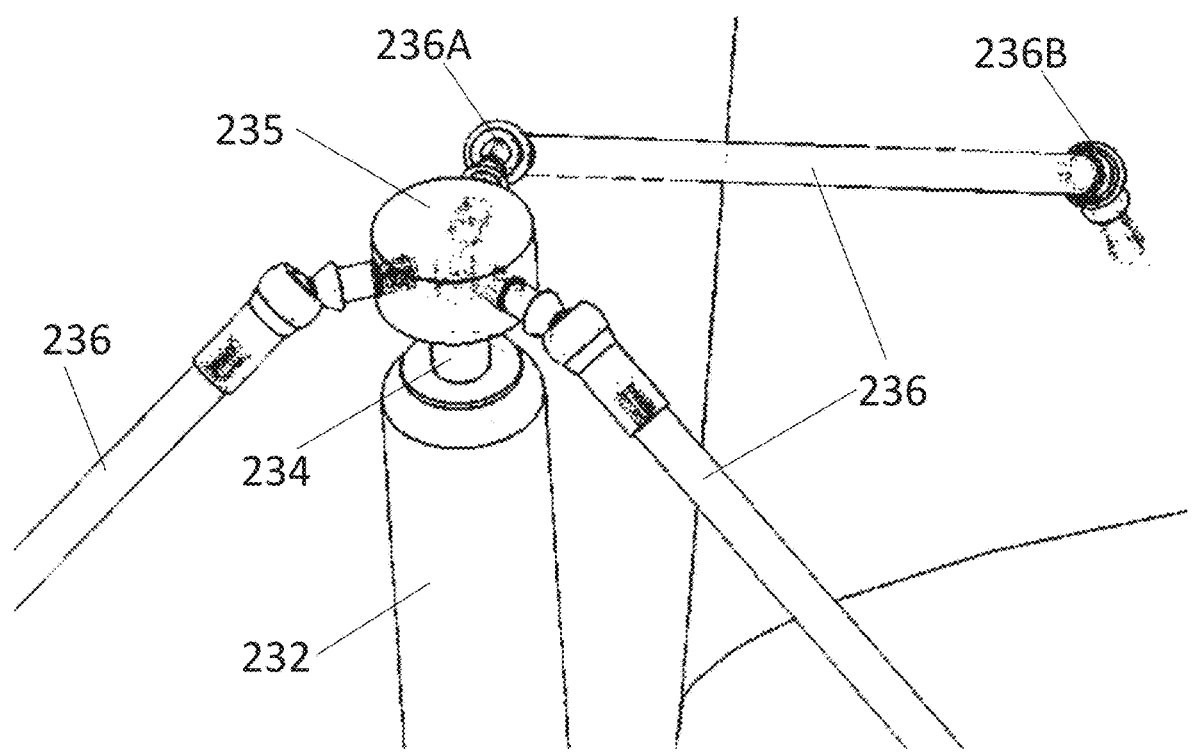
FIG. 19 is an enlarged view of each hinged blade assembly 120 incorporating a biasing structure 230.

Turning to FIGS. 17 to 23, a second embodiment of a wind turbine assembly 200 is illustrated. Like reference numerals denote like features that have been previously described. The main difference between the present wind turbine assembly 200 when compared with the previously described turbine assembly 100 relates to a variation in the manner in which the hinged outer blade sections 122 are biased using a more centralised biasing structure 230. As shown most clearly in FIG. 19, the biasing mechanism comprises of a single traction gas spring 230 where all three blade assemblies 230 are attached to a central piston rod 234 via connecting arms 236. The piston rod 234 is movably disposed within a centrally located fluid filled cylinder 232. The traction gas spring 230 is placed parallel to the axis of rotation along the central hub 213. One end of the cylinder 232 is attached to a rotor hub plate 211 positioned on the hub 213. All three blade assemblies 120 are connected to the piston rod 234 with the connecting rods or arms 236. An attachment member 235 is attached to the piston rod 234 so one end of the connecting arm 236 is fixed to the attachment plate 235 via movable joint 237 and the other end of the connecting rod 236 is attached to the respective outer blade section for each blade assembly 120. Both ends of the connecting rod 236 are mounted with ball joints 236A and 236B as shown in FIG. 19. The ball joint connects two non-parallel elements and allows the rotation between them up to a specific angle. Due to the upward and downward movement in the piston rod 234, the angle between the connecting rod 236 and the axis of rotation changes continuously and the ball joint mechanism (236A and 236B) provides free movement.

Figure 20:
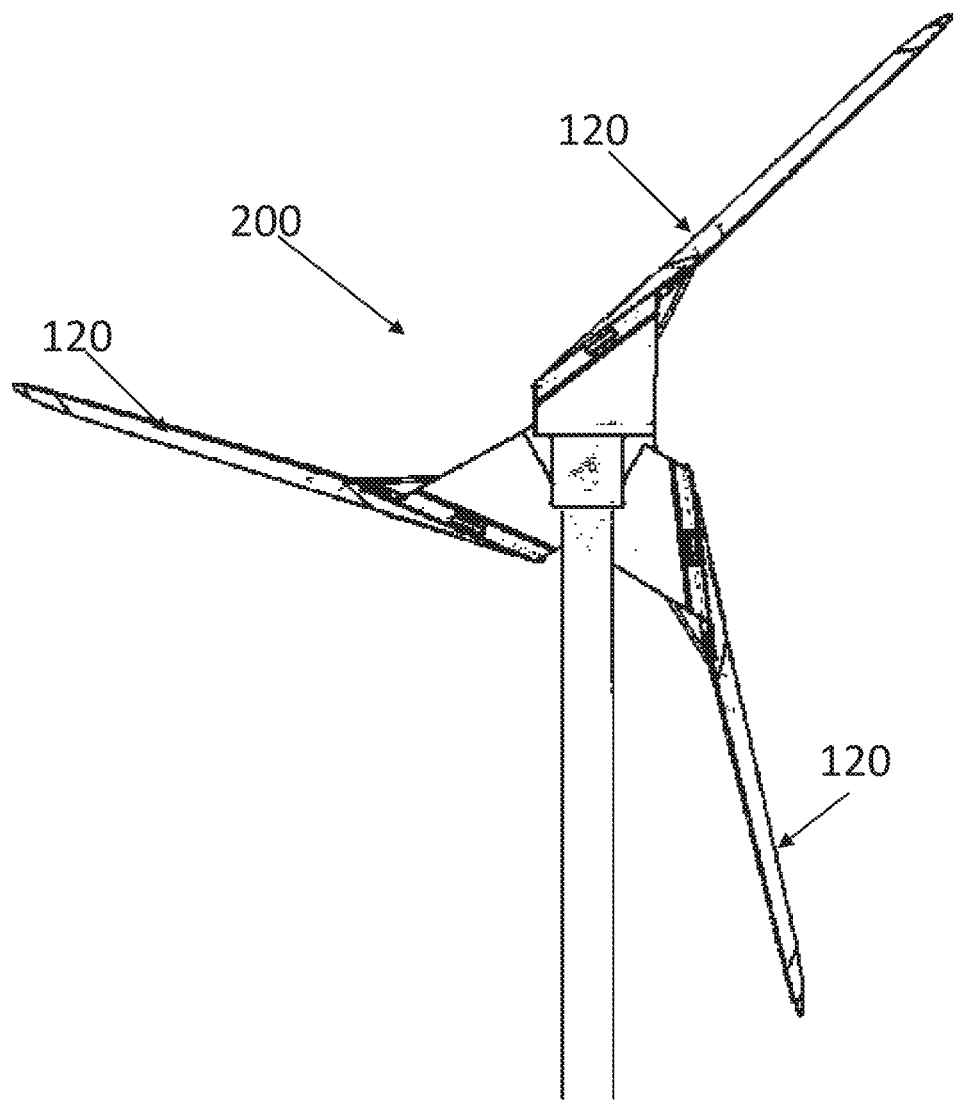
FIG. 20 is a rear view of the wind turbine assembly 200 shown in a coned or pitched configuration.
Figure 21:
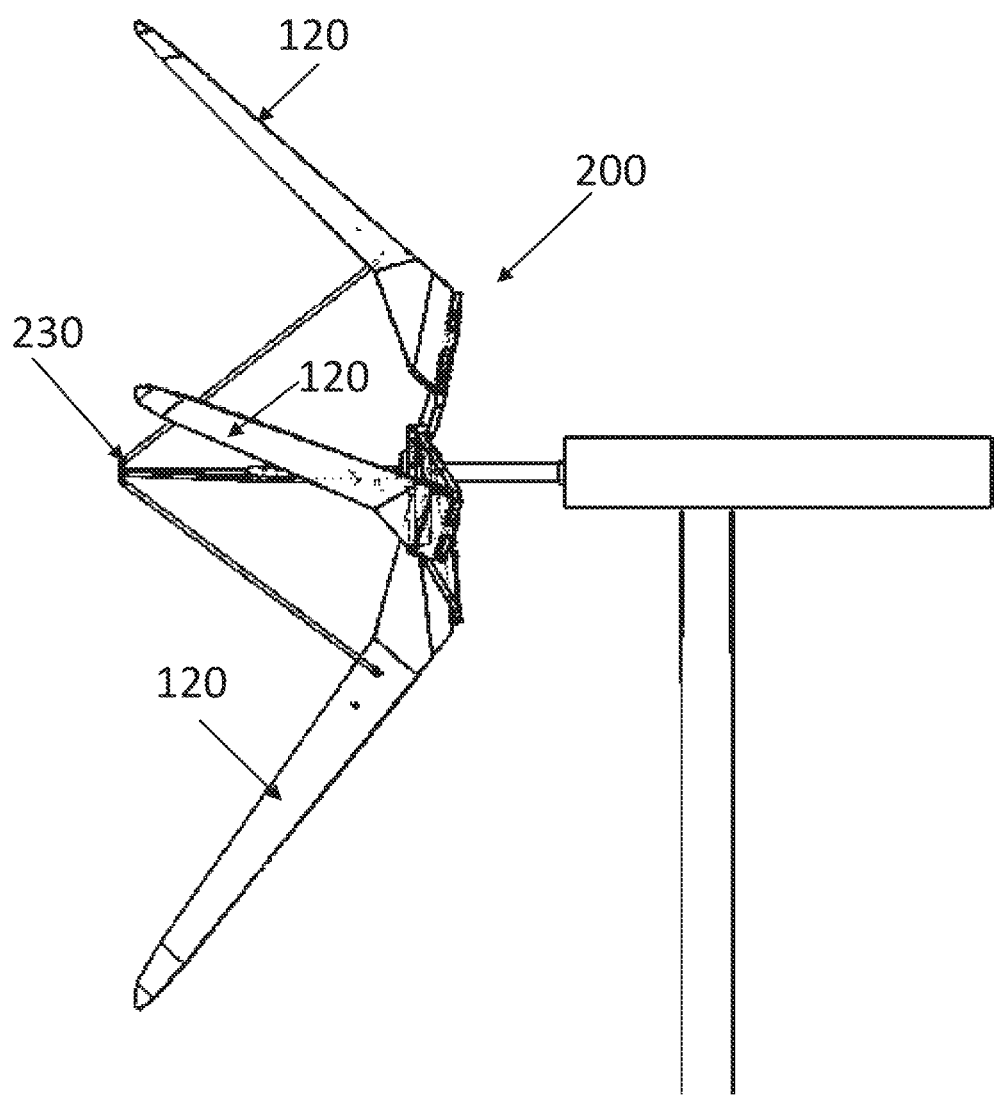
FIG. 21 is a side view of the wind turbine assembly 200 shown in a coned or pitched configuration.
Figure 22:
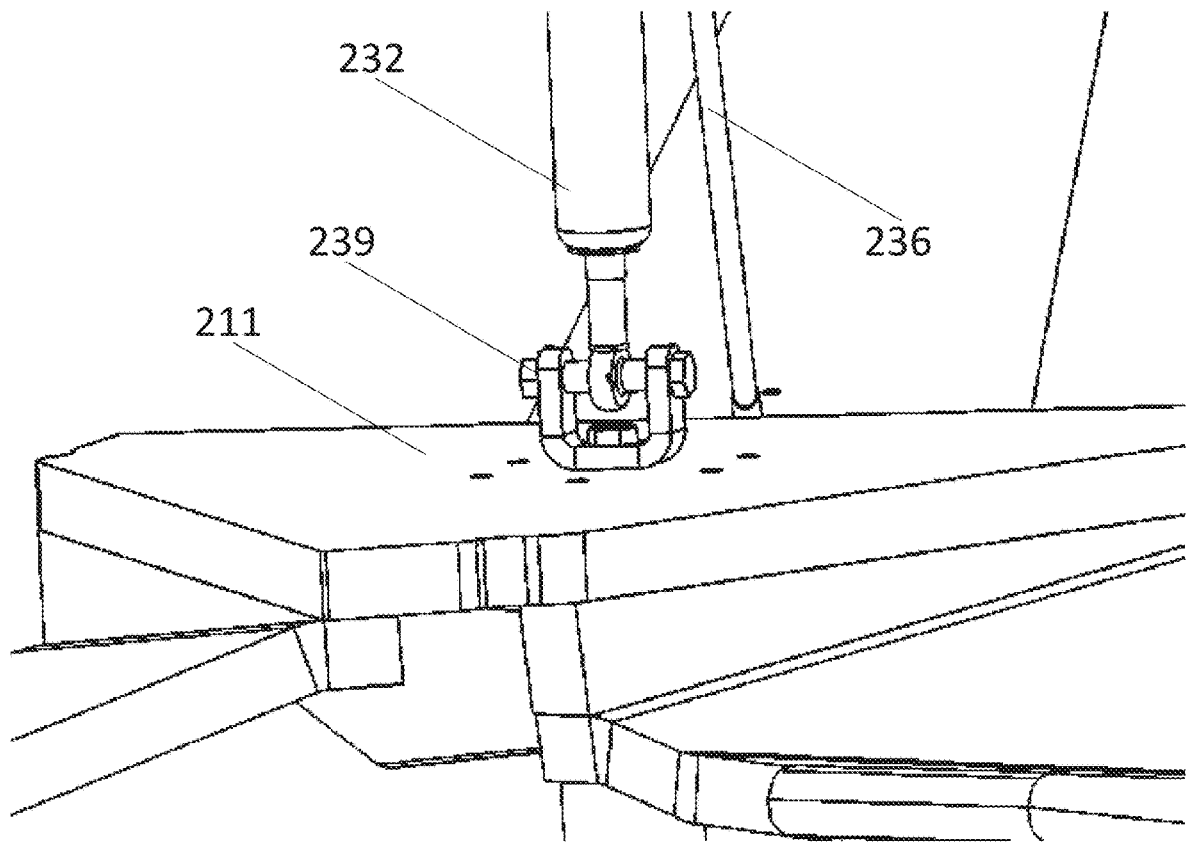
FIG. 22 is an enlarged view of a swivel ball joint 239 is provided positioned between the cylinder 232 and the rotor hub plate 211.
Figure 23A:
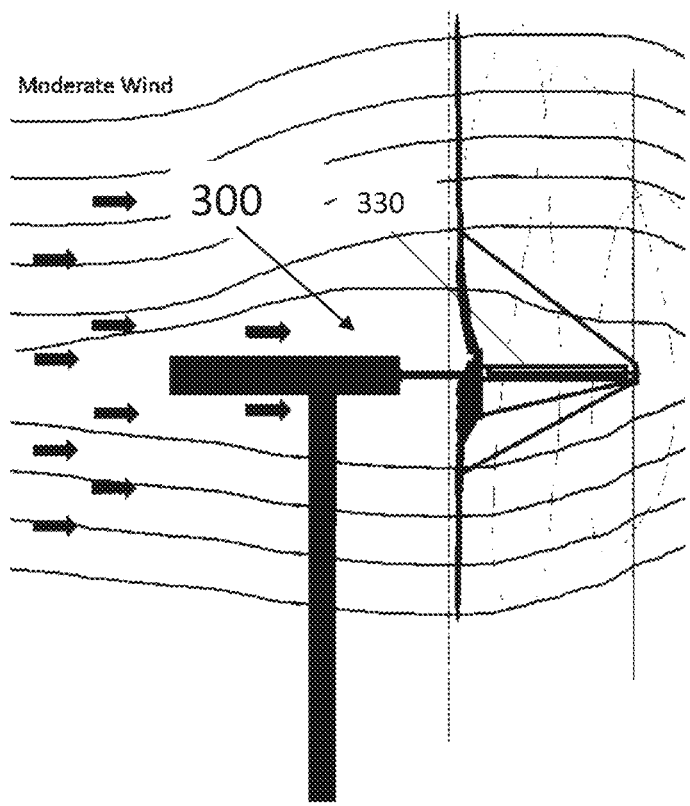
FIGS. 23A and 23B illustrate side views of a wind turbine assembly 300 in accordance with a third embodiment operating in moderate wind conditions and high wind conditions respectively.
Figure 23B:
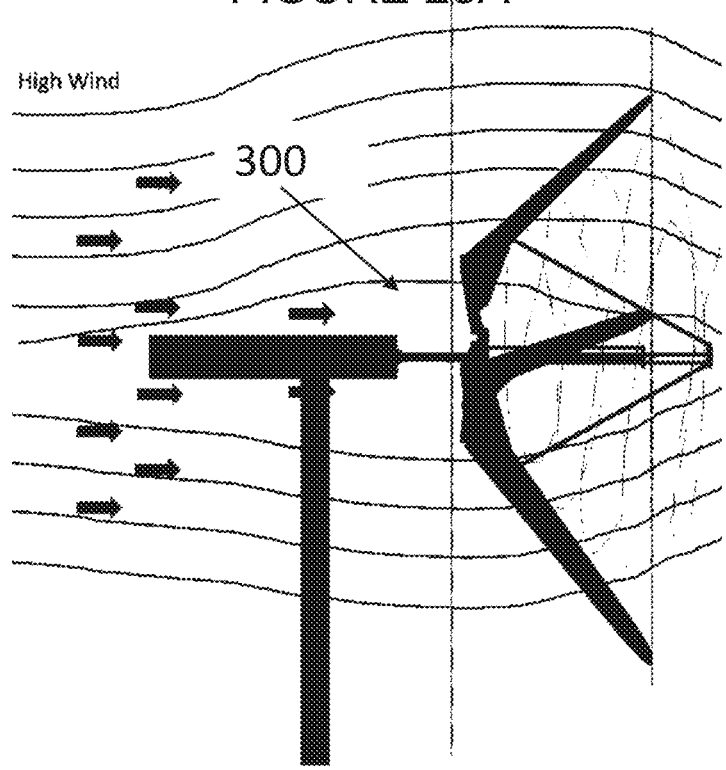

FIGS. 20 and 21 illustrate the wind turbine assembly 200 in a coned configuration whereby wind speeds overcome the biasing force applied by the traction spring 230 to result in a pitched and coned configuration. FIGS. 17 and 18, on the other hand, illustrate the wind turbine assembly 100 in which the damping system 230 is shown at an initial stage when the wing sections 122 are in a fully extended configuration.

As previously described, the traction spring 230 comprises the cylinder 232 in which the piston rod 234 is movably positioned. When wind speeds are not significantly high, the piston rod 234 is unloaded within the cylinder 232 at the initial position. At higher wind speeds the forces produced by the three blade assemblies 120 are increasing and move, thereby pushing the piston rod 234. Since all three blades are attached to be same traction spring 230, pitching and coning of the outer blade sections for each of the blade assemblies is even. It has been envisioned that the biasing system 230 may be affected by side forces. Specifically, side forces are the forces acting on the turbine perpendicular to the axis of rotation. It is desirable to avoid such side forces, since these forces may have a huge impact on the lifetime of the gas spring 230. It is preferable that the piston rod 234 must not be bent or exposed to side forces. In order to avoid side forces, a swivel ball joint 239 is provided (swivel joints are components used for the connection between stationary parts and rotating parts of machine) between the cylinder 232 and the rotor hub plate 211 as shown in FIG. 10. In the preferred embodiment, the swivel joint 239 has a dynamic load rating of 8160 N and static load rating of 22,000 N, radially.

Figure 24:
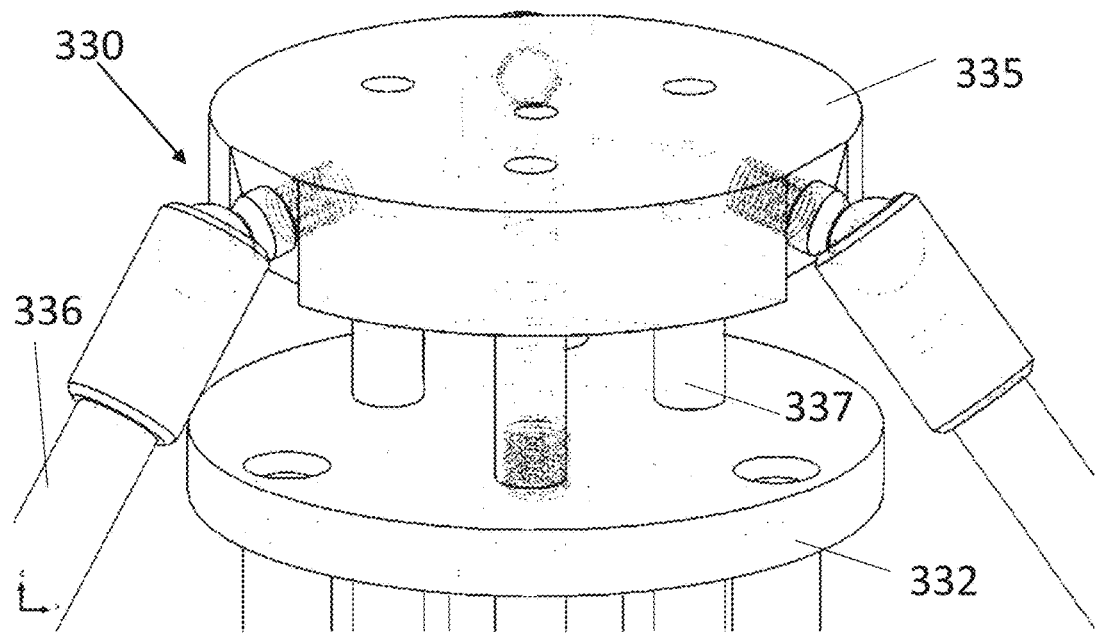
FIG. 24 is an enlarged view of the biasing structure 330 being used in the wind turbine assembly 300.
Figure 25:
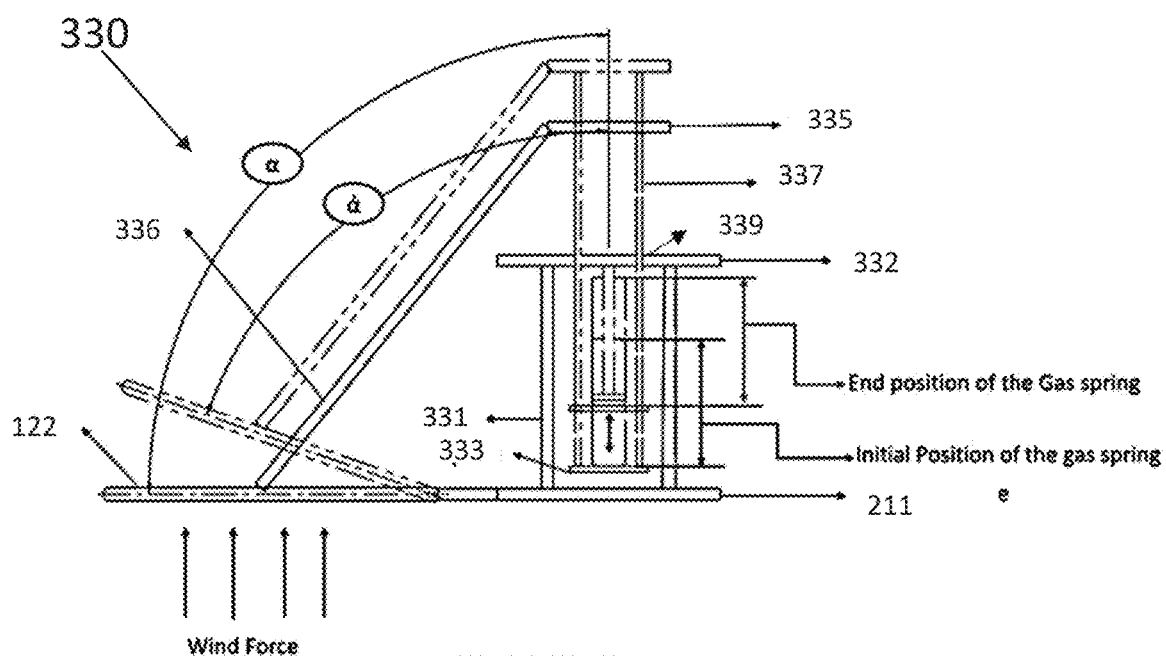
FIG. 25 is a sectional view of the biasing structure 330.

FIGS. 24 to 25 a third embodiment of the wind turbine assembly 300. The main difference between the wind turbine assembly 300 and the previously described wind turbine assembly 200 relates to a difference in the manner in which a biasing force is applied on the outer blade section 122 of each blade assembly 120. Once again, like reference numerals, denote like features which have been previously described.

The biasing structure is provided in the form of a compression gas spring 330 which has been used instead of the traction gas spring 230 (described in the earlier sections). FIGS. 24 and 25 show detailed views of the compression gas spring 330. One end of the gas spring 330 is fastened to a fixed plate 332 and the other end of the gas spring is fastened to a bottom plate 333 of the movable member 334. The fixed portion of the compression gas spring 330 comprises the fixed plate 332 consists and three supporting rods 331. The movable member 334 consists of the top plate 335, a bottom plate 336 and three shafts 337. One end of the connecting rod 336 is attached to the top plate and the other end is attached to the outer blade section 122 blade with ball joints 336A and 336B. All three blade assemblies 120 are attached to the top plate 335 of the movable member 334. Advantageously, slide bearings 339 are used to reduce the friction and to make that the movement smooth. Due to movement in the movable member 334 between the connecting rod and the axis of rotation changes continuously. In this assembly, the required tilt angle is 45°. So, ball joints are attached to the top plate at an angle of 15° to the plane of surface as shown in FIG. 13. This is due to standard ball joints having tilt angle limitation of 25° to 35°.

The maximum capacity of the generator may be limited to 10 kW. Initial calculations (based on simulations) have indicated that the turbine 300 reaches maximum output of 10 kW at 11 m/s. Therefore, at the moderate wind velocity (up to 11 m/s) there is no movement in the damping system 330. When the wind velocity increases (High wind) over 11 m/s, the compressive gas spring 330 comes into effect. The following FIGS. 11a) & b) Illustrate the movement of the turbine for various wind velocities.

Advantageously, the damping structure 330 can withstand side forces without affecting the movable member 334 because the side forces are transmitted through the reinforcing rods 331.

Figure 26:
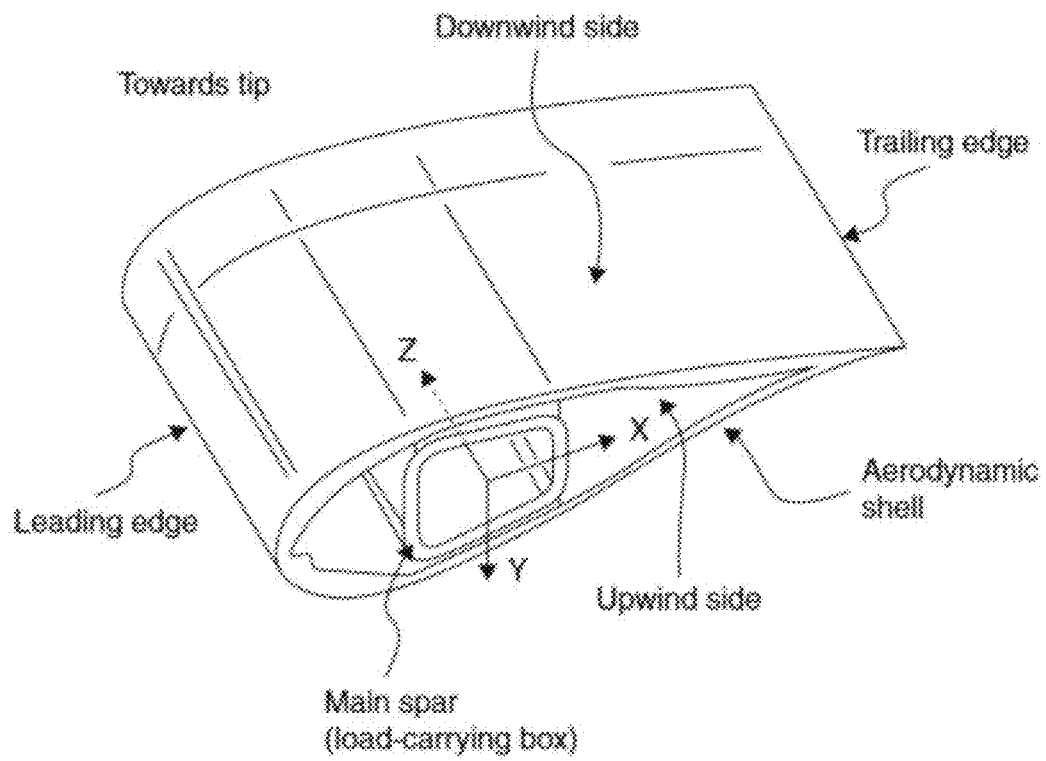
FIG. 26 is a sectional perspective view of the blade section 122.

Referring to FIGS. 26 to 19, a preferred blade design has been described foe the blade assembly 120. It is to be understood that the blade design in no way limits the use of the damping arrangements described in the previous sections.

The blade design of a wind turbine is a compromise between aerodynamic and structural considerations. Aerodynamic considerations usually dominate the design for at least two-thirds of the length of the outer section 122 the blade assembly. In contrast, structural considerations are more important for designing the inner one third portion of the blade section 122. Referring to FIG. 26 (sectional view of the blade section 122), the blade section 122 is typically hollow, with the outer geometry formed by two shells: one on the suction side and another one on the pressure side. One or more structural webs are fitted to join the two shells together and to transfer shear loads. The main spar is the most critical structural element in the wind turbine blade design. The material stiffness and strength greatly impact the blade spar cap, and carbon fiber composites potentially offer the greatest benefit in this section. The length of the blade section 122 is preferably around 2.6 meters and is made of Glass fibre reinforced plastic (GFRP).

Figure 27:
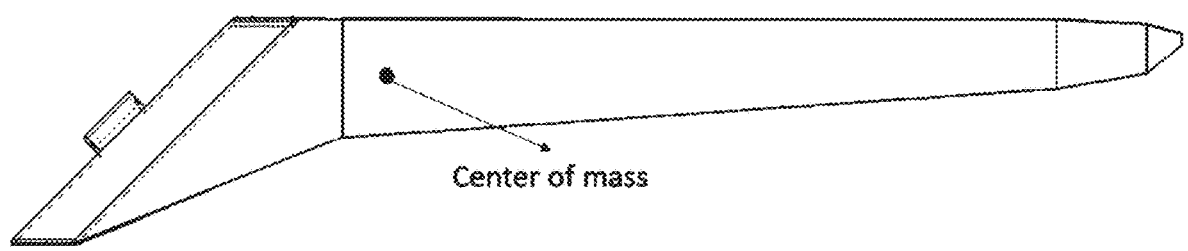
FIG. 27 is an isolated view of the blade section 122.
Figure 28:
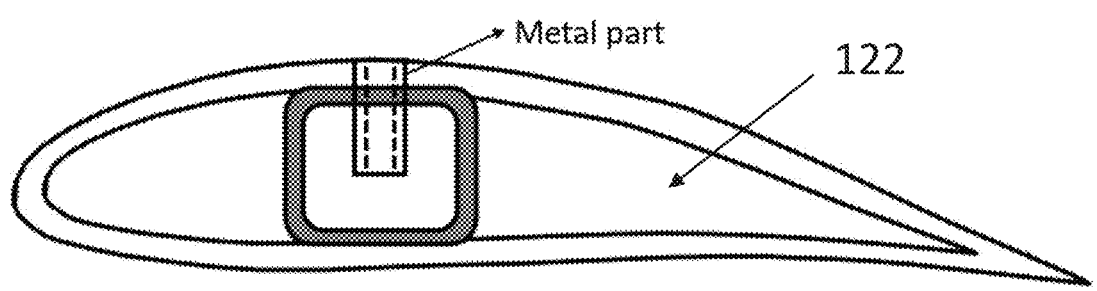
FIG. 28 is a sectional view of the blade section 122.
Figure 29:
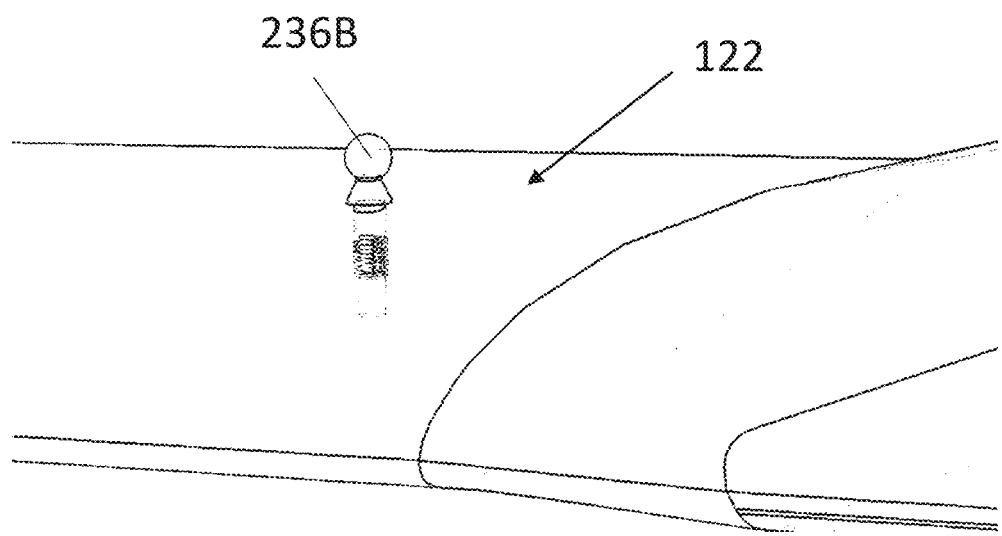
FIG. 29 is an enlarged surface view of the blade section 122.

Using CAD software, the approximate location for the centre of mass is located for the blade section 122, as shown in FIG. 27. This is the point where any uniform force acts on the blade. At this position, a metal part is moulded into the blade as shown in the FIG. 29 to mount the ball joint 236B into it. A ball joint is then placed to assure a movable connection between the blade section 122 and the damper system 230 or 330. The provision of the ball joint 236B allows free rotation in two planes at the same time while preventing translation in any direction, including rotating in those planes. Ball joints allow a limited range of smooth movement in all directions.

Figure 30:
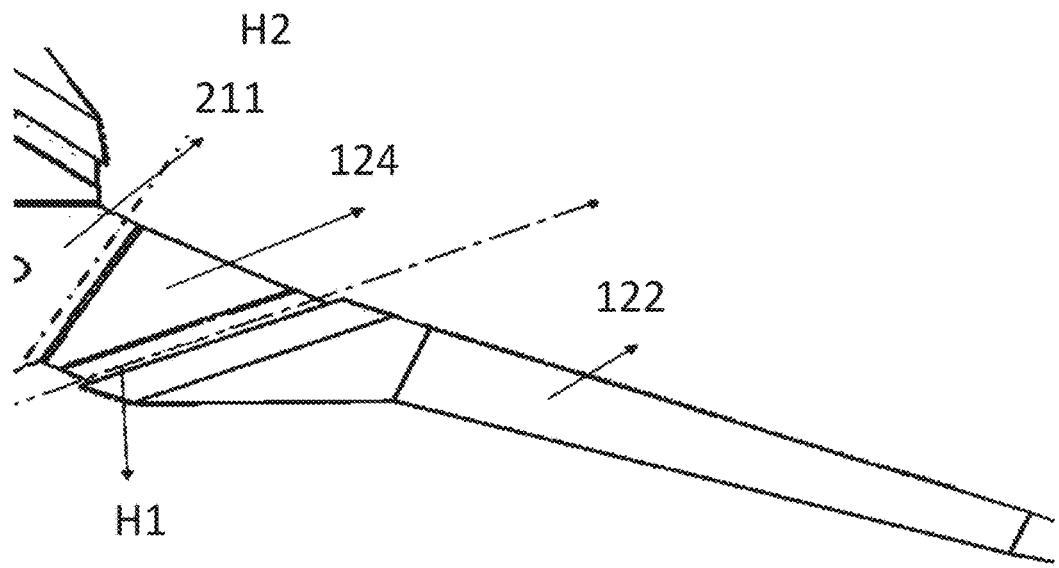
FIG. 30 is an enlarged view of the blade assembly 120 showing sections 122 and 124.
Figure 31:
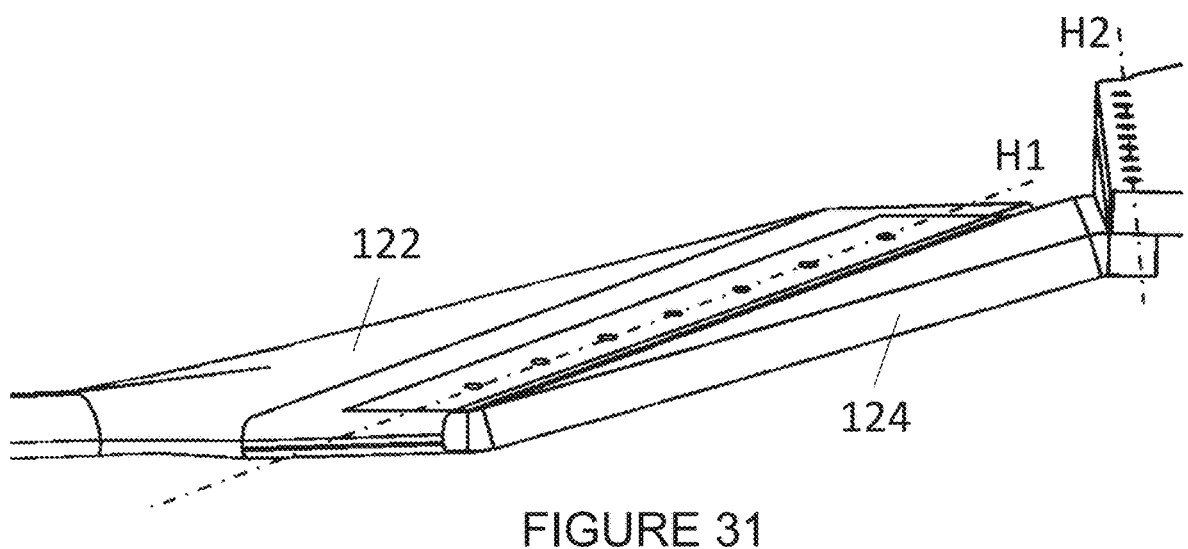
FIG. 31 is another enlarged view of the blade assembly 120 showing blade sections 122 and hinge section 124.

Turning to FIGS. 30 and 31 the inner hinge section 124 is a flexible mechanical device which allows rotation about a limited angle. Each blade section 122 is connected to the central hub 113 by a flexible hinge member 124. The hinge defines nonparallel hinge axis as shown in FIG. 18 and is made from polymeric material such as polyurethane. The hinge 124 comprises a body that is capable of hinging movement at the hinge axis, wherein the body is formed from flexible resilient material in which reinforcing particulate material is distributed. Each hinge 124 may be fixed to the blade 122 and to the hub 113 by fasteners such as bolts and nuts. A support member, typically a plate may be fixed to both faces of the hinge body 124 to cover the area between the axes, so that the plate helps to define the axis of the hinge 124.

Referring to FIG. 31, at the base hinge axis H2 to adopt a base pitch with respect to the hub under the centrifugal force caused by rotation of the hub during the use. Base pitch may be said to be centrifugally regulated. This hinge axis configuration allows the wind turbine to regulate its rotational speed to maximise the output. The blades will pitch and cone to protect the turbine and allowing the continual operation during the high-speed storms.

Figure 32:
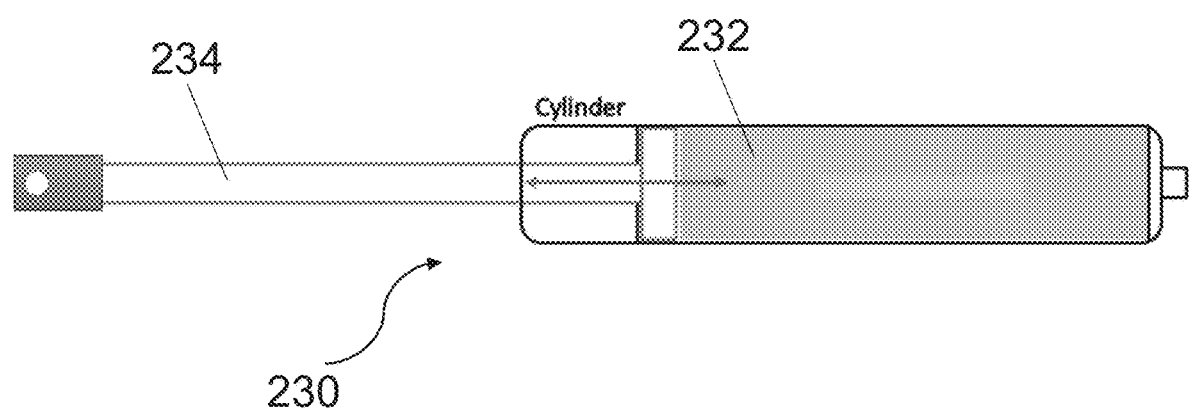
FIG. 32 is a sectional view of a gas spring used for damper system 230.

Referring to FIG. 32, an internal view of a gas spring has been shown. Such hydro-pneumatic (containing both gas and liquid) lifting mechanisms help to raise, lower, and support heavy objects. Gas springs are designed to act as dampers to withstand higher compression or extraction forces than steel wire versions due to pressurised gas properties. This makes gas springs ideal for the range of heavy-duty industrial settings, where the moving component exerting force on the spring would be significant to push back effectively. Compression gas spring such as the one used in damper system 330 are primarily used to balance weight. In the standard piston type arrangement (shown in damper system 230), the piston rod 234 of the gas pressure is always protracted, and the pressure which acts upon both sides of the piston is equal and compressible. When a force is employed on the piston rod 234, the piston 234 compresses the gas towards the cylinder 232. Because of the penetration of the piston into the cylinder 232, the gas pressure increases. When the external forces are decreased, the piston 234 turns to its initial position. The parameters for the selection of damper mechanism to be used in the embodiments described herein are the stroke length and the minimum and maximum forces exerted on the piston 234. The minimum and maximum forces acting on the damper are calculated in respect to the position of ball joints on the blade. The moment forces in the hinge section 124 may be obtained by using MATLAB for the different pitch of the blades.

While the preferred embodiment of the present invention utilises a piston cylinder having a compressible gas, the person skilled in the art would readily appreciate that there exist alternative arrangements which perform the same function which fall within the scope of the present invention. For example, in some embodiments the present invention may utilise a hydraulic fluid and a resilient bladder to store energy to move a piston to/from a neutral position.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. A wind turbine hub assembly, comprising:
    a plurality of radially arranged blade attachment members for attaching blades having a radially outer blade section with a leading edge and a trailing edge, wherein each blade extends outwardly from and about a central axis of rotation;
    a central hub assembly configured to rotate about the axis of rotation, with the plurality of blade attachment members radially arranged and hingedly connected to the central hub assembly by respective hinge arrangements to allow movement of the blade attachment members relative to the central hub assembly; and
    one or more biasing structures operatively coupled with each blade attachment member, wherein a first end of each said biasing structure is attached to the central hub assembly and a second end of each said biasing structure is attached to a respective one of the blade attachment members, for applying a biasing force, during use, to extend the blade attachment member and an outer section of each blade to a neutral pitched position, whereby the biasing structure resists the movement of the blade attachment member and an outer section of each blade to a coned position during use,
    wherein each said biasing structure comprises a damping assembly comprising a sealed, fluid-filled cylinder configured to apply the biasing force on a piston rod and extend the piston rod in the neutral pitched position.

2. The wind turbine hub assembly in accordance with claim 1, wherein the central hub assembly comprises a central plate, with the plurality of the blade attachment members radially arranged and hingedly connected to the central plate at respective connecting locations by the respective hinge arrangements, allowing movement of the blade attachment members relative to the central plate.

3. Wind turbine hub assembly in accordance with claim 2, wherein the central hub assembly further comprises a shaft receiving member spaced away from the central plate along the axis of rotation, the first end of each said biasing structure being attached to the shaft receiving member.

4. The wind turbine hub assembly in accordance with claim 1, wherein each said biasing structure is movable between:
    an extended configuration to apply the biasing force to maintain the blades and the blade attachment members in the neutral pitched position; and
    a retracted configuration when the forces applied by wind overcome the biasing force of each said biasing structure.

5. The wind turbine hub assembly in accordance with claim 4, wherein, in the extended position, the central plate substantially lies in the same plane as the blade attachment members.

6. The wind turbine hub assembly in accordance with claim 3, wherein the first end of each said biasing structures is attached to the central hub assembly by a first swivel joint mechanism.

7. The wind turbine hub assembly in accordance with claim 6, wherein the first end of each said biasing structures is attached to a portion of said shaft receiving member by the first swivel joint mechanism.

8. The wind turbine hub assembly in accordance with claim 1, wherein the second end of each said biasing structures is attached to a radially inner end portion of a respective blade attachment member by a second swivel joint mechanism.

9. The wind turbine hub assembly in accordance with claim 8, wherein the second end of each said biasing structures is attached to an attachment arm extending radially inward from the inner end portion of the respective blade attachment member.

10. The wind turbine hub assembly in accordance with claim 9, wherein each blade attachment member is hingedly connected to the central plate by one or more spaced apart hinge members, with the attachment arm extending transversely relative to a hinge axis defined by the hinge members.

11. The wind turbine hub assembly in accordance with claim 9, wherein, in the neutral position, the second end of each said biasing structure is offset from the hinge axis by its attachment to the attachment arm.

12. The wind turbine hub assembly in accordance with claim 10, wherein the hinge axis for each blade attachment members extends transversely across the plane of the attached blade, and wherein the hinge axes of the blade attachment members are non-parallel to each other.

13. The wind turbine hub assembly in accordance with claim 2, wherein the second end of each said biasing structures moves away from the central plate as the attached blade attachment member moves towards the coned position, thereby increasing the inclination angle of each said the biasing structure relative to the central plate.

14. The wind turbine hub assembly in accordance with claim 1, wherein the first end of each said biasing structure is located at or near an end of the cylinder, and the second end is located at or near an end of the piston rod.

15. A wind turbine assembly comprising:
    a plurality of blade assemblies, each blade assembly comprising a blade with a radially outer blade section having a leading edge and a trailing edge, wherein each blade extends outwardly from and about an axis of rotation;
    a central hub connected to a radially inner portion of each blade assembly, the central hub being configured to rotate about the axis of rotation;
    wherein the radially inner portion of each blade assembly is hingedly connected to the radially outer blade section by a hinge arrangement, allowing relative movement of the radially outer section about a hinge axis; and a biasing structure operatively coupled with each blade, wherein a first part of the biasing structure is attached to the central hub and a second part is attached to the outer section of each blade, for applying a biasing force to extend the outer section to a neutral pitched position, and whereby the biasing force applied by the biasing structure resists movement of the outer section of each blade to a coned position during use, wherein said biasing structure comprises a damping assembly comprising a sealed, fluid-filled cylinder configured to apply the biasing force on a piston rod and extend the piston rod in the neutral pitched position.

16. The wind turbine assembly in accordance with claim 15, wherein the biasing structure applies the biasing force such that, in the neutral pitched position, an angle between the hub's plane of rotation and the leading edge of each blade is less than ten degrees.

17. The wind turbine assembly in accordance with claim 15, wherein the biasing structure allows movement of the outer blade section to the coned position when forces from wind overcome the resistive force, such that an angle between the hub's plane of rotation and the leading edge of each blade in the coned position is greater than thirty degrees and less than ninety degrees.

18. The wind turbine assembly in accordance with claim 15, wherein the biasing structure is movable between:

an extended configuration to apply the biasing force to maintain the blades in the neutral pitched position; and a retracted configuration when forces applied by wind overcome the biasing force.

19. The wind turbine assembly in accordance with claim 18, wherein, in the retracted configuration, the angle between the hub's plane of rotation and the leading edge of each blade in the coned position is greater than thirty degrees less than ninety degrees.

* * * * *